(12) United States Patent
Koreeda et al.

(10) Patent No.: US 7,843,792 B2
(45) Date of Patent: Nov. 30, 2010

(54) OPTICAL INFORMATION RECORDING/REPRODUCING DEVICE AND OBJECTIVE LENS FOR THE SAME

(75) Inventors: Daisuke Koreeda, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 598 days.

(21) Appl. No.: 11/765,498

(22) Filed: Jun. 20, 2007

(65) Prior Publication Data

US 2007/0297314 A1  Dec. 27, 2007

(30) Foreign Application Priority Data

Jun. 21, 2006 (JP) ............... 2006-170815

(51) Int. Cl.
*G11B 7/135* (2006.01)
(52) U.S. Cl. ............... 369/112.23; 369/112.08
(58) Field of Classification Search ............ None
See application file for complete search history.

(56) References Cited

U.S. PATENT DOCUMENTS

| | | | |
|---|---|---|---|
| 6,646,817 B2 | 11/2003 | Katsuma | |
| 7,035,193 B2 | 4/2006 | Takeuchi et al. | |
| 2005/0007931 A1* | 1/2005 | Sakamoto et al. | 369/112.01 |
| 2005/0041560 A1* | 2/2005 | Katsuma et al. | 369/112.08 |
| 2005/0117495 A1* | 6/2005 | Itonaga | 369/112.01 |
| 2005/0122882 A1* | 6/2005 | Kimura | 369/112.04 |
| 2005/0157623 A1* | 7/2005 | Itonaga | 369/112.05 |
| 2005/0232121 A1* | 10/2005 | Konno et al. | 369/112.23 |
| 2005/0237900 A1* | 10/2005 | Sano et al. | 369/112.08 |
| 2005/0265150 A1* | 12/2005 | Hirayama et al. | 369/44.37 |
| 2006/0181978 A1 | 8/2006 | Koreeda et al. | |

2006/0280061 A1  12/2006  Koreeda et al.

FOREIGN PATENT DOCUMENTS

| | | |
|---|---|---|
| JP | 2002 6210 | 1/2002 |
| JP | 2004 247025 | 9/2004 |
| JP | 2005 100586 | 4/2005 |

OTHER PUBLICATIONS

English language Abstract of JP 2004-247025.
U.S. Appl. No. 11/762,096 to Koizumi et al., filed Jun. 13, 2007.

* cited by examiner

*Primary Examiner*—Peter Vincent Agustin
*Assistant Examiner*—Emily Frank
(74) *Attorney, Agent, or Firm*—Greenblum & Bernstein P.L.C.

(57) ABSTRACT

There is provided an objective lens including a first optical member and a second optical member which are made of materials different from each other and are cemented together at a cementing surface. The cementing surface includes a first phase shift structure having a plurality of refractive surface zones concentrically formed about an optical axis of the objective lens. The first phase shift structure satisfies conditions (1) and (2):

$$0.85 < \Phi 2/\Phi 1 < 1.15 \quad (1)$$

$$0.10 < |(\Phi 3 - \Phi 2)/\Phi 1| < 0.50 \quad (2)$$

where $\Phi 1 = m(\lambda_1) \times (\lambda_1/(n2(\lambda_1) - n1(\lambda_1)))$, $\Phi 2 = m(\lambda_2) \times (\lambda_2/(n2(\lambda_2) - n1(\lambda_2)))$, $\Phi 3 = m(\lambda_3) \times (\lambda_3/(n2(\lambda_3) - n1(\lambda_3)))$, $m(\lambda_1)$, $m(\lambda_2)$, and $m(\lambda_3)$ are diffraction orders at which diffraction efficiencies of the first through third light beams are maximized, respectively, n1 $(\lambda_1)$, n1 $(\lambda_2)$, and n1 $(\lambda_3)$ are refractive indexes of the first optical member, respectively, and n2 $(\lambda_1)$, n2 $(\lambda_2)$, and n2 $(\lambda_3)$ are refractive indexes of the second optical member, respectively.

21 Claims, 9 Drawing Sheets

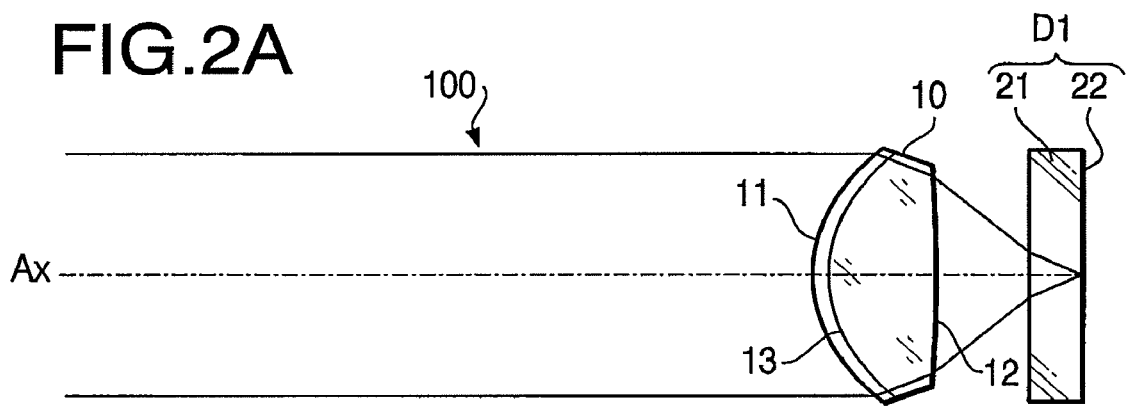
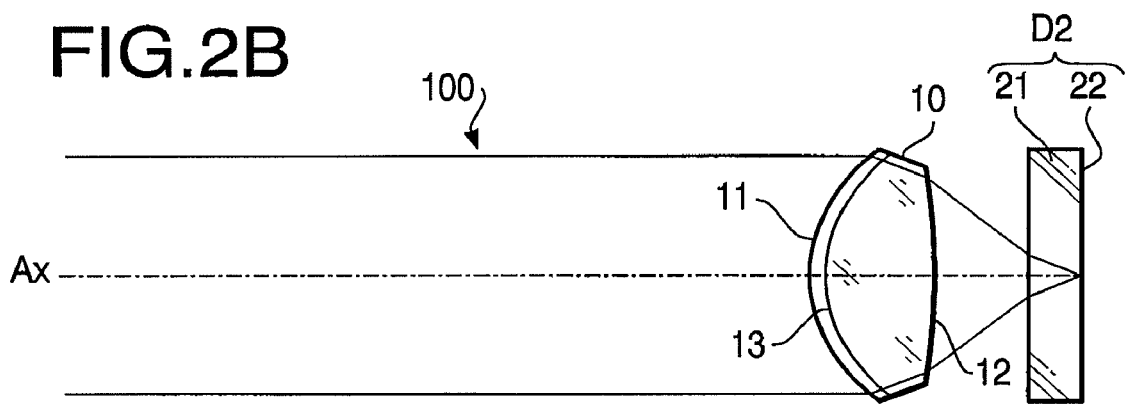
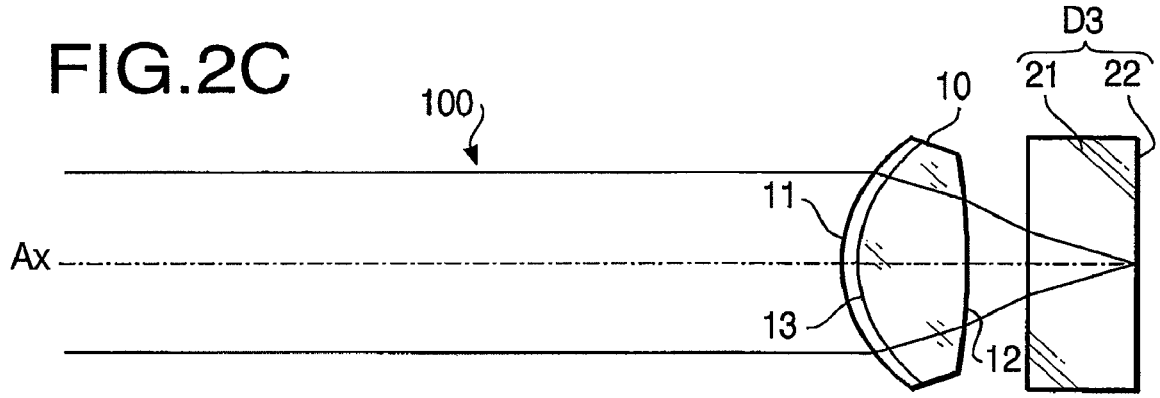

-0.005   0.005        -0.005   0.005        -0.005   0.005

-0.005   0.005      -0.005   0.005      -0.005   0.005

OPTICAL INFORMATION RECORDING/REPRODUCING DEVICE AND OBJECTIVE LENS FOR THE SAME

BACKGROUND OF THE INVENTION

The present invention relates to an objective lens which is installed in a device employing multiple types of light beams having different wavelengths, such as an optical information recording/reproducing device for recording data to and/or reproducing data from multiple types of optical discs differing in data density.

There exist various standards of optical discs (CD, DVD, etc.) differing in data density, protective layer thickness, etc. Meanwhile, new-standard optical discs (HD DVD (High-Definition DVD), BD (Blu-ray Disc), etc.), having still higher data density than DVD, are being brought into practical use in recent years to realize still higher information storage capacity. The protective layer thickness of such a new-standard optical disc is substantially equal to or less than that of DVD. In consideration of user convenience with such optical discs according to multiple standards, the optical information recording/reproducing devices (more specifically, objective lenses installed in the devices) of recent years are required to have compatibility with the above three types of optical discs. Incidentally, in this specification, the "optical information recording/reproducing devices" include devices for both information reproducing and information recording, devices exclusively for information reproducing, and devices exclusively for information recording. The above "compatibility" means that the optical information recording/reproducing device ensures the information reproducing and/or information recording with no need of component replacement even when the optical disc being used is switched.

In order to provide an optical information recording/reproducing device with the compatibility with optical discs of multiple standards, the device has to be configured to be capable of forming a beam spot suitable for the particular data density of the new disc (in the switching of the optical disc to the new disc of a different standard) by changing a NA (Numerical Aperture) of the light beam employed for the information reproducing/registering, while also correcting spherical aberration which varies depending on the protective layer thickness. Since the diameter of the beam spot can generally be made smaller as the wavelength of the beam gets shorter, multiple laser beams having different wavelengths are selectively used by the optical information recording/reproducing device depending on the data density of the disc. For example, for DVDs, a laser beam with a wavelength of approximately 660 nm (shorter than approximately 790 nm for CDs) is used. For the aforementioned new-standard optical discs, a laser beam with a wavelength still shorter than that for DVDs (e.g. so-called "blue laser" around 408 nm) is used in order to deal with the extra-high data density.

As a technique for converging a light beam onto the record surface of each of the multiple types of optical discs, a technique of configuring an objective lens to have, on one of surfaces thereof, an annular zone structure including ring-shaped minute steps has been proposed. According to this technique, the light beams having different wavelengths can suitably be converged onto respective the record surfaces of the multiple optical discs.

Japanese Patent Provisional Publication No. 2004-247025 (hereafter, referred to as JP2004-247025A) discloses an objective lens configured to have the compatibility with the three types of optical discs such as CD, DVD and HD DVD.

In an optical pick-up disclosed in JP2004-247025A, three types of collimated light beams having different wavelengths are used so that the objective lens has the compatibility with the three types of optical discs having different densities and has the function of correcting the spherical aberration.

However, the optical pick-up disclosed in JP2004-247025A has a drawback that undesired diffraction order light having substantially the same light amount as that of the normal diffraction order light used for information recording and information reproducing is generated. For this reason, there is a demand for an objective lens enabling the optical information recording/reproducing device to be capable of accurately executing the information recording and the information reproducing while maintaining the function of accurately recording information to and/or reproducing information from the multiple types of optical discs.

SUMMARY OF THE INVENTION

The present invention is advantageous in that an objective lens for an optical information recording/reproducing device (which executes information recording or reproducing on three types of optical discs of different standards by selectively using multiple light beams having different wavelengths), capable of forming a desirable beam spot on a record surface of each optical disc while reducing various aberrations (e.g. spherical aberration) irrespective of which of the three types of optical discs is used, realizing high-accuracy information reproduction/recordation while securing high diffraction efficiency irrespective of which of the three types of optical discs is used, can be provided.

According to an aspect of the invention, there is provided an objective lens used for an optical information recording/reproducing device for recording information to and/or reproducing information from three types of optical discs including a first optical disc having a highest recording density, a second optical disc having a second highest recording density and a third optical disc having a lowest recording density, by selectively using one of three types of light beams including first, second and third light beams. In this configuration, when wavelengths of the first to third light beams are respectively represented by $\lambda_1$ (nm), $\lambda_2$ (nm) and $\lambda_3$ (nm), $\lambda_1 < \lambda_2 < \lambda_3$ is satisfied. When a thickness of a protective layer of the first optical disc requiring use of the first light beam is represented by t1 (mm), a thickness of a protective layer of the second optical disc requiring use of the second light beam is represented by t2 (mm), and a thickness of a protective layer of the third optical disc requiring use of the third light beam is represented by t3 (mm), $t1 \leq t2 < t3$ is satisfied. When a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 being satisfied.

Further, the objective lens includes a first optical member and a second optical member which are made of materials different from each other and are cemented together at a cementing surface. The cementing surface includes a first phase shift structure having a plurality of refractive surface zones concentrically formed about an optical axis of the objective lens. The first phase shift structure satisfies conditions (1) and (2):

$$0.85 < \Phi2/\Phi1 < 1.15 \quad (1)$$

$$0.10 < |(\Phi3 - \Phi2)/\Phi1| < 0.50 \quad (2)$$

where $\Phi1 = m(\lambda_1) \times (\lambda_1/(n2(\lambda_1) - n1(\lambda_1)))$, $\Phi2 = m(\lambda_2) \times (\lambda_2/(n2(\lambda_2) - n1(\lambda_2)))$, $\Phi3 = m(\lambda_3) \times (\lambda_3/(n2(\lambda_3) - n1(\lambda_3)))$, $m(\lambda_1)$, $m(\lambda_2)$, and $m(\lambda_3)$ are diffraction orders at which diffraction efficiencies of the first through third light beams are maximized, respectively, $n1(\lambda_1)$, $n1(\lambda_2)$, and $n1(\lambda_3)$ are refractive indexes of the first optical member, respectively, and $n2(\lambda_1)$, $n2(\lambda_2)$, and $n2(\lambda_3)$ are refractive indexes of the second optical member, respectively.

By configuring the objective lens to satisfy the above mentioned conditions (1) and (2), it is possible to suitably correct spherical aberration for each of the three types of optical discs even if the first to third light beams are respectively incident on the objective lens as substantially collimated beams.

In at least one aspect, the first phase shift structure further satisfies conditions (3) and (4):

$$1.00 \leq \Phi2/\Phi1 < 1.15 \qquad (3)$$

$$0.20 < |(\Phi3-\Phi2)/\Phi1| < 0.50 \qquad (4).$$

In at least one aspect, the first phase shift structure further satisfies a condition (5):

$$0.20 < |(\Phi3-\Phi2)/1| < 0.40 \qquad (5).$$

In at least one aspect, the first phase shift structure further satisfies condition (6) and (7):

$$0.85 < \Phi2/\Phi1 < 1.00 \qquad (6)$$

$$0.20 < |(\Phi3-\Phi2)/\Phi1| < 0.35 \qquad (7).$$

In at least one aspect, the objective lens includes two surfaces other than the cementing surface, and one of the two surfaces includes a second phase shift structure having a plurality of refractive surface zones concentrically formed about the optical axis. In this case, the second phase shift structure may be configured to give an additional optical path length substantially equal to $2\lambda_1$ to the first light beam, between adjacent ones of the plurality of refractive surface zones.

In at least one aspect, the objective lens includes two surfaces other than the cementing surface, and one of the two surfaces includes a second phase shift structure having a plurality of refractive surface zones concentrically formed about the optical axis. In this case, the second phase shift structure may be configured to give an additional optical path length substantially equal to $10\lambda_1$ to the first light beam, between adjacent ones of the plurality of refractive surface zones.

In at least one aspect, the first phase shift structure is formed, on the cementing surface, in a first region including the optical axis. In this case, the first region is configured to converge at least the third light beam on a record surface of the third optical disc.

In at least one aspect, the cementing surface has a second region located outside the first region. In this case, the second region is formed to be a refraction surface having a function of converging the first and second light beams on record surfaces of the first and second optical discs, respectively, and not contributing to convergence of the third light beam.

In at least one aspect, the cementing surface has a second region located outside the first region. In this case, the second region may be configured to converge the first and second light beams on record surfaces of the first and second optical discs, respectively, and not to contribute to convergence of the third light beam. In this case, the second region may include a third phase shift structure having a plurality of refractive surface zones concentrically formed about the optical axis.

In at least one aspect, the second phase shift structure is formed in a third region on the one of the two surfaces of the objective lens. In this case, the third region is configured to converge at least the third light beam on a record surface of the third optical disc.

In at least one aspect, one of the two surfaces other than the cementing surface includes a fourth region located outside the third region, and the fourth region includes a fourth phase shift structure having a plurality of refractive surface zones concentrically formed about the optical axis. In this case, the fourth phase shift structure is configured to give an additional optical path length substantially equal to $3\lambda_1$ to the first light beam, between adjacent ones of the plurality of refractive surface zones.

In at least one aspect, one of the two surfaces other than the cementing surface includes a fourth region located outside the third region, and the fourth region includes a fourth phase shift structure having a plurality of refractive surface zones concentrically formed about the optical axis. In this case, the fourth phase shift structure is configured to give an additional optical path length substantially equal to $5\lambda_1$ to the first light beam, between adjacent ones of the plurality of refractive surface zones.

In at least one aspect, the objective lens satisfies a condition (8):

$$f1 \times NA1 > f2 \times NA2 \qquad (8)$$

where f1 represents a focal length defined when the first optical disc is used, and f2 represents a focal length defined when the second optical disc is used. In this case, the cementing surface includes a fifth region which is located outside the second region and is configured to converge only the first light beam on the record surface of the first optical disc and not to contribute to convergence of each of the second and third light beams.

In at least one aspect, the objective lens satisfies a condition (9):

$$f1 \times NA1 < f2 \times NA2 \qquad (9)$$

In this case, the cementing surface includes a fifth region which is located outside the second region and is configured to converge only the second light beam on the record surface of the second optical disc and not to contribute to convergence of each of the first and third light beams.

In at least one aspect, the fifth region includes a fifth phase shift structure having a plurality of refractive surface zones concentrically formed about the optical axis. In this case, the fifth phase shift structure is configured such that an absolute value of an optical path length difference given to the first light beam between adjacent ones of the plurality of refraction surface zones is different from an absolute value of an optical path length difference given to the first light beam in the second region.

In at least one aspect, the fifth region includes a fifth phase shift structure having a plurality of refractive surface zones concentrically formed about the optical axis. In this case, the fifth phase shift structure is configured such that an absolute value of an optical path length difference given to the second light beam between adjacent ones of the plurality of refraction surface zones is different from an absolute value of an optical path length difference given to the second light beam in the second region.

In at least one aspect, the objective lens satisfies a condition (8):

$$f1 \times NA1 > f2 \times NA2 \qquad (8)$$

In this case, one of the two surfaces other than the cementing surface includes a sixth region which is located outside the fourth region and is configured to converge only the first light beam on the record surface of the first optical disc and not to contribute to convergence of each of the second and third light beams. The sixth region includes a sixth phase shift structure having a plurality of refractive surface zones concentrically formed about the optical axis. Further, the sixth phase shift structure is configured such that an absolute value of an optical path length difference given to the first light beam between adjacent ones of the plurality of refraction surface zones is different from an absolute value of an optical path length difference given to the first light beam in the fourth region.

In at least one aspect, the objective lens satisfies a condition (9):

$$f1 \times NA1 < f2 \times NA2 \qquad (9).$$

In this case, one of the two surfaces other than the cementing surface includes a sixth region which is located outside the fourth region and is configured to converge only the second light beam on the record surface of the second optical disc and not to contribute to convergence of each of the first and third light beams. The sixth region includes a sixth phase shift structure having a plurality of refractive surface zones concentrically formed about the optical axis. Further, the sixth phase shift structure is configured such that an absolute value of an optical path length difference given to the second light beam between adjacent ones of the plurality of refraction surface zones is different from an absolute value of an optical path length difference given to the second light beam in the fourth region.

In at least one aspect, the objective lens is configured to satisfy a condition (10):

$$0.01 < d1/d2 < 0.20 \qquad (10)$$

where d1 represents a center thickness of the first optical member (unit: mm), and d2 represents a center thickness of the second optical member (unit: mm).

According to another aspect of the invention, there is provided an optical information recording/reproducing device for recording information to and/or reproducing information from three types of optical discs including a first optical disc having a highest recording density, a second optical disc having a second highest recording density and a third optical disc having a lowest recording density, by selectively using one of three types of light beams including first, second and third light beams. The optical information recording/reproducing device includes light sources that respectively emit the first, second and third light beams having different wavelengths; and the above mentioned objective lens.

In at least one aspect, t1 is approximately 0.6 mm, t2 is approximately 0.6 mm and t3 is approximately 1.2 mm.

BRIEF DESCRIPTION OF THE ACCOMPANYING DRAWINGS

FIGS. 2A to 2C are schematic diagrams showing the relationship among the objective lens, the optical disc and the optical path of the laser beam (first laser beam, second laser beam, third laser beam) in cases where the first through third optical discs D1-D3 are used, respectively.

Figure 5A:
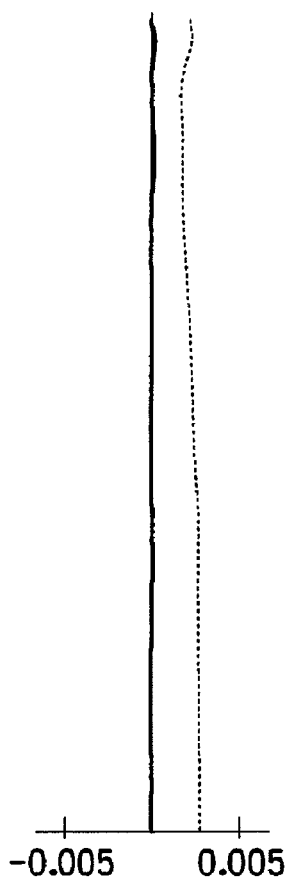
Figure 5B:
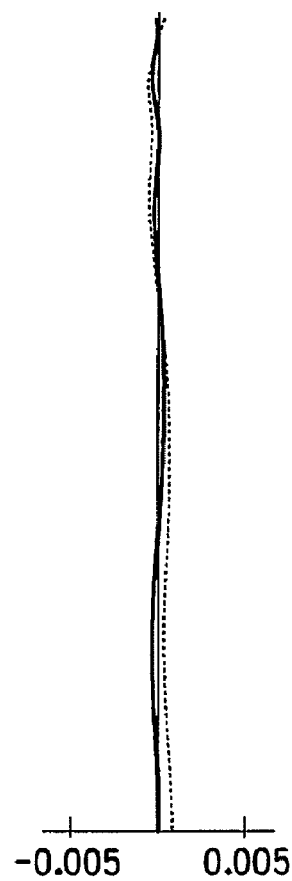
Figure 5C:
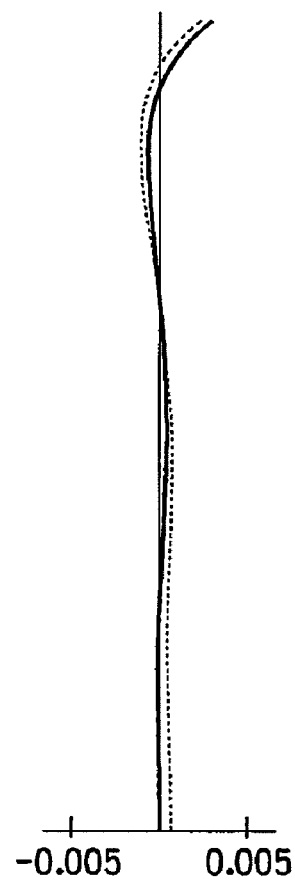

FIGS. 5A to 5C respectively show spherical aberrations caused by the objective lens according to a first example when first to third laser beams are used.

Figure 6A:
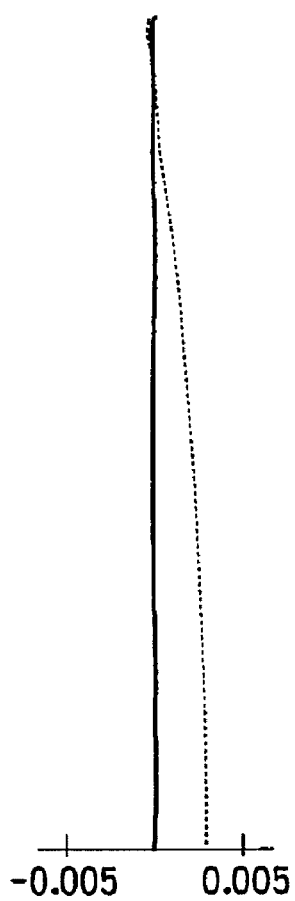
Figure 6B:
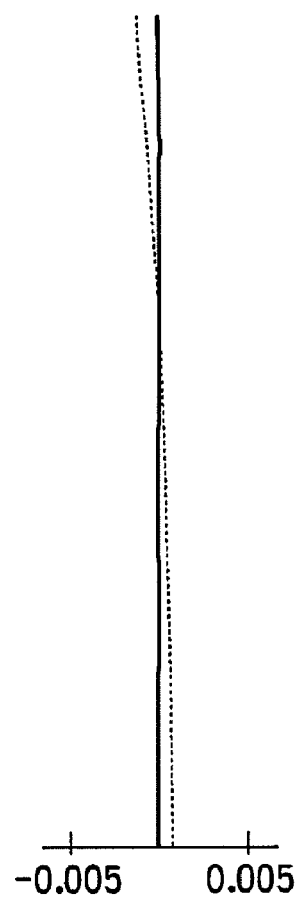
Figure 6C:
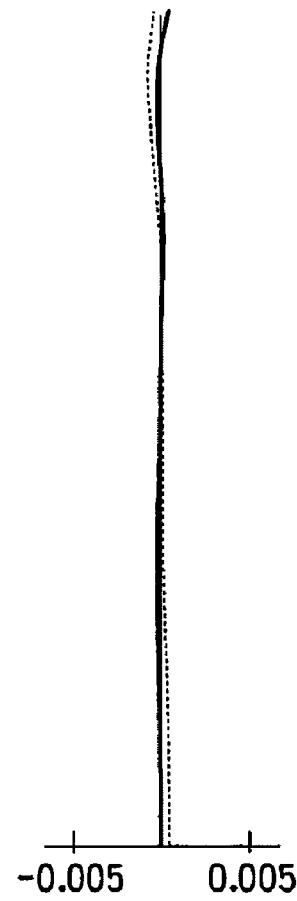

FIGS. 6A to 6C respectively show spherical aberrations caused by the objective lens according to a second example when first to third laser beams are used.

Figure 7A:
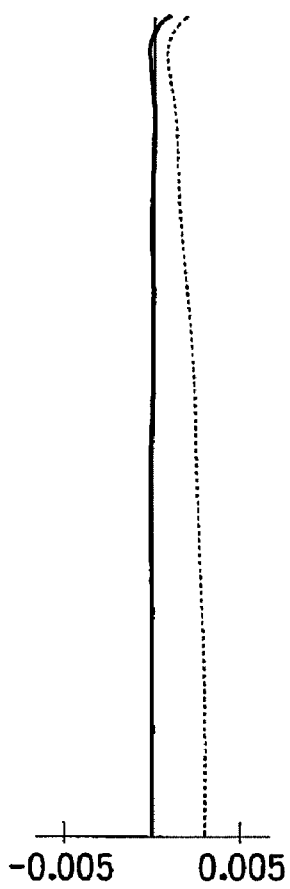
Figure 7B:
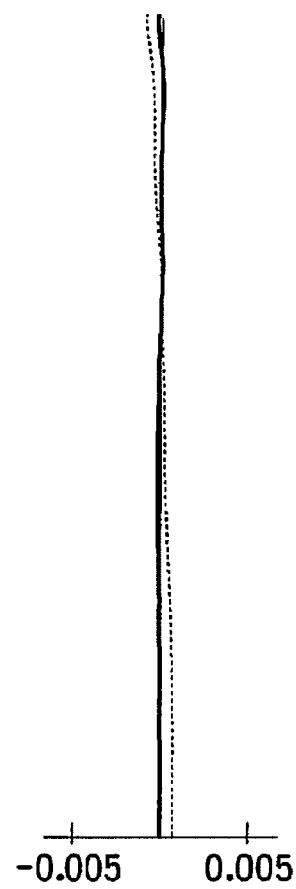
Figure 7C:
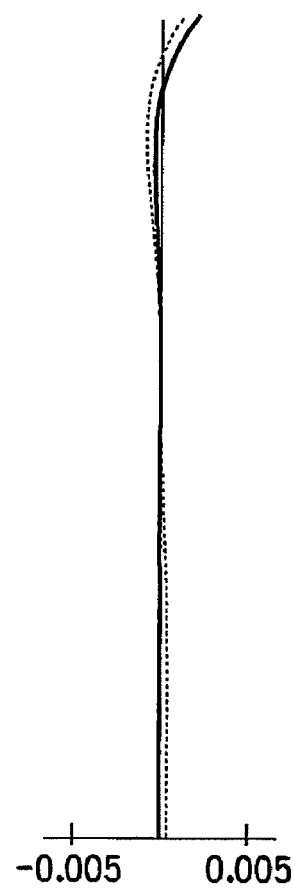

FIGS. 7A to 7C respectively show spherical aberrations caused by the objective lens according to a third example when first to third laser beams are used.

Figure 8A:
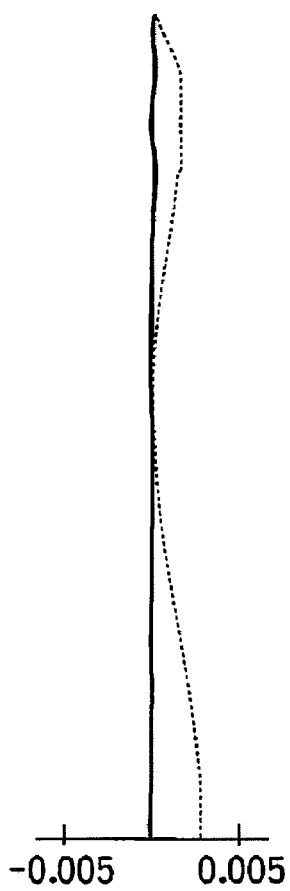
Figure 8B:
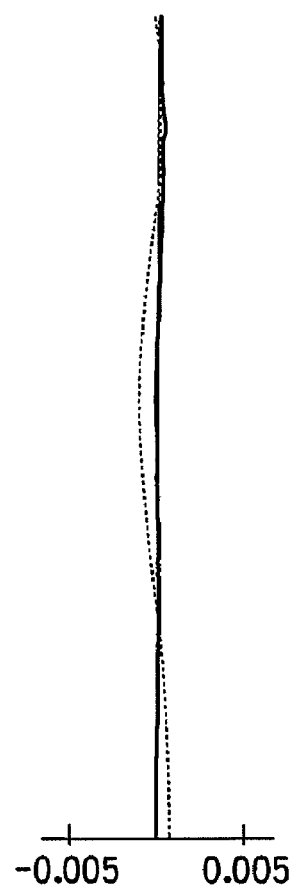
Figure 8C:
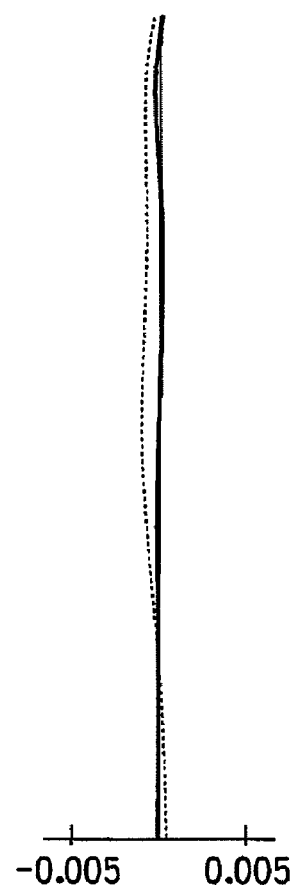

FIGS. 8A to 8C respectively show spherical aberrations caused by the objective lens according to a fourth example when first to third laser beams are used.

Figure 9A:
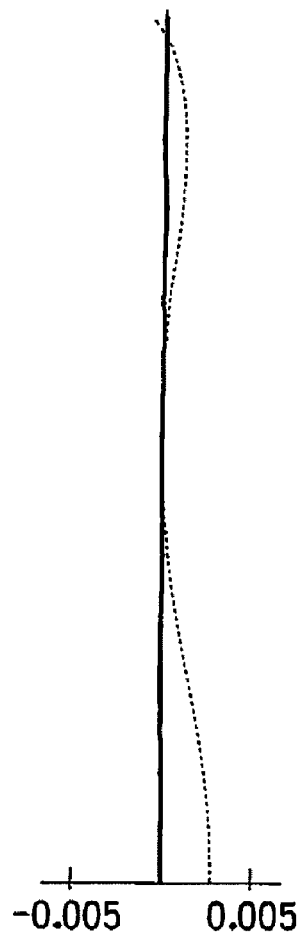
Figure 9B:
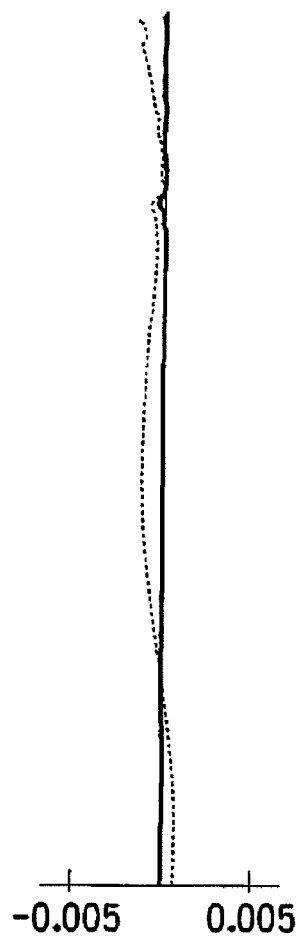
Figure 9C:
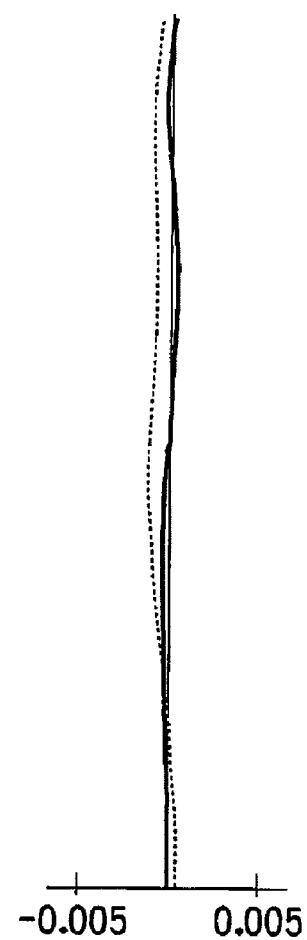

FIGS. 9A to 9C respectively show spherical aberrations caused by the objective lens according to a fifth example when first to third laser beams are used.

DETAILED DESCRIPTION OF THE EMBODIMENTS

Referring now to the drawings, a description will be given in detail of a preferred embodiment in accordance with the present invention.

In the following, an objective lens in accordance with an embodiment of the present invention will be described. The objective lens of this embodiment, which is installed in an optical information recording/reproducing device, has the compatibility with three types of optical discs according to different standards (protective layer thickness, data density, etc.).

In the following explanation, an optical disc of a type (one of the three types) having the highest data density (e.g. new-standard optical disc such as HD DVD, DVD or BD) will be referred to as a "first optical disc D1", an optical disc of a type having a relatively low data density compared to the first optical disc D1 (DVD, DVD-R, etc.) will be referred to as a "second optical disc D2", and an optical disc of a type having the lowest data density (CD, CD-R, etc.) will be referred to as a "third optical disc D3" for convenience of explanation.

If the protective layer thicknesses of the first through third optical discs are defined as t1, t2, t3, respectively, the protective layer thicknesses satisfy the following relationship:

$$t1 \leq t2 < t3$$

In order to carry out the information reproducing/recording on each of the optical discs D1-D3, the NA (Numerical Aperture) required for the information reproducing/recording has to be varied properly so that a beam spot suitable for the particular data density of each disc can be formed. When the optimum design numerical apertures required for the information reproducing/recording on the three types of optical discs D1, D2 and D3 are defined as NA1, NA2 and NA3, respectively, the numerical apertures (NA1, NA2, NA3) satisfy the following relationships:

$$(NA1 > NA3) \text{ and } (NA2 > NA3)$$

Specifically, for the information recording/reproducing on the first or second optical disc D1, D2 (having high data density), a relatively large NA is required since a relatively small spot has to be formed. On the other hand, for the information recording/reproducing on the third optical disc D3 (having the lowest data density), the required NA is relatively small. Incidentally, each optical disc is set on a turntable (not shown) and rotated at high speed when the information recording/reproducing is carried out.

In cases where three types of optical discs D1-D3 (having different data densities) are used as above, multiple laser beams having different wavelengths are selectively used by the optical information recording/reproducing device so that a beam spot suitable for each data density can be formed on the record surface of the optical disc being used. Specifically, for the information recording/reproducing on the first optical disc D1, a "first laser beam" having the shortest wavelength (first wavelength) is emitted from a light source so as to form the smallest beam spot on the record surface of the first optical disc D1. On the other hand, for the information recording/reproducing on the third optical disc D3, a "third laser beam" having the longest wavelength (third wavelength) is emitted from a light source so as to form the largest beam spot on the record surface of the third optical disc D3. For the information recording/reproducing on the second optical disc D2, a "second laser beam" having a wavelength longer than that of the first laser beam and shorter than that of the third laser beam (second wavelength) is emitted from a light source so as to form a relatively small beam spot on the record surface of the second optical disc D2.

Figure 1:
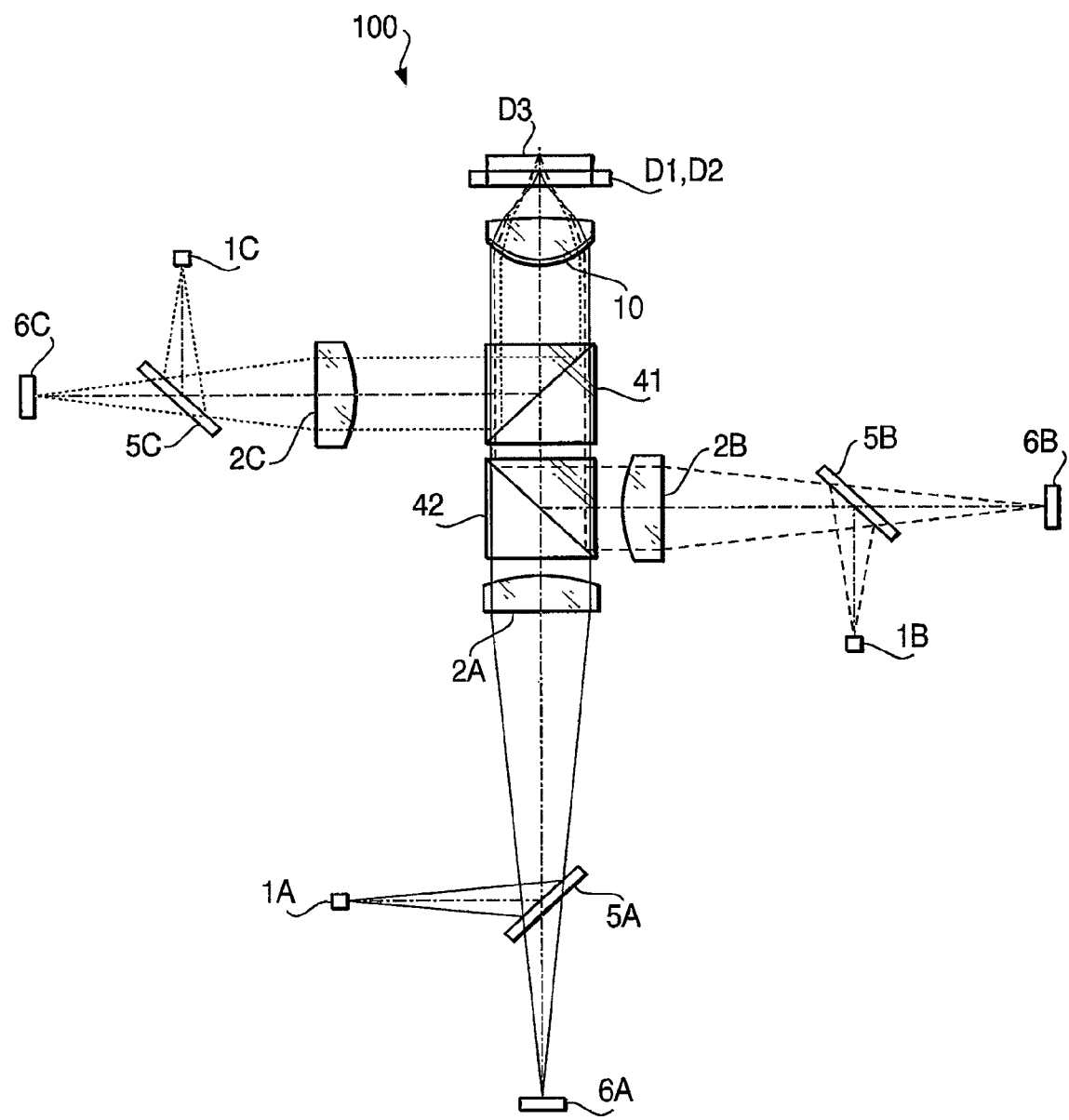
FIG. 1 is a schematic diagram showing the overall composition of an optical information recording/reproducing device which is equipped with an objective lens according to an embodiment.

FIG. 1 is a schematic diagram showing the overall composition of an optical information recording/reproducing device 100 which is equipped with an objective lens 10 according to the embodiment. The optical information recording/reproducing device 100 includes a light source 1A which emits the first laser beam, a light source 1B which emits the second laser beam, a light source 1C which emits the third laser beam, coupling lenses 2A, 2B and 2C, beam splitters 41 and 42, half mirrors 5A, 5B and 5C, and photoreceptor units 6A, 6B and 6C. Incidentally, since the optical information recording/reproducing device 100 has to support various NAs required for the information recording/reproducing on various optical discs, an aperture restricting element for specifying the beam diameter of the third laser beam may also be placed on an optical path of the third laser beam between the light source 1C and the objective lens 10 (although not shown in FIG. 1).

As shown in FIG. 1, the laser beams (first laser beam, second laser beam, third laser beam) emitted by the light sources 1A, 1B, and 1C are converted by the coupling lenses 2A, 2B and 2C, respectively, into collimated beams. Thus, each coupling lens (2A, 2B, 2C) functions as a collimator lens in this embodiment. Each laser beam passing through the coupling lens (2A, 2B, 2C) is guided to a common optical path by the beam splitters 41 and 42 and thereafter enters the objective lens 10. Each beam passing through the objective lens 10 is converged on a point in the vicinity of the record surface of the optical disc (D1, D2, D3) as the target of the information reproduction/recordation. After being reflected by the record surface, the laser beams pass through the half mirrors 5A, 5B and 5C, respectively, and then the laser beams are detected by the photoreceptor units 6A, 6B and 6C, respectively.

By letting each coupling lens 2A-2C convert each laser beam (to be incident upon the objective lens 10) into a collimated beam as above, off-axis aberration occurring during the tracking of the objective lens 10 (e.g. coma aberration) can be suppressed.

Incidentally, there are cases where each light beam emerging from each coupling lens (2A, 2B, 2C) is not necessarily a collimated beam in a strict sense, due to various factors such as individual differences and installation positions of the light sources 1A-1C, and variations in the environment around the optical information recording/reproducing device 100. However, the divergence angle of the light beam caused by the above factors is extremely small and the aberration occurring during the tracking shifts can also be regarded to be small, by which substantially no problem is caused in practical use.

FIGS. 2A-2C are schematic diagrams showing the relationship among the objective lens 10, the optical disc (D1-D3) and the optical path of the laser beam (first laser beam, second laser beam, third laser beam) in cases where the first through third optical discs D1-D3 are used, respectively. In each of FIGS. 2A-2C, a reference axis AX of an optical system of the optical information recording/reproducing device 100 is indicated by a chain line. Incidentally, while the optical axis of the objective lens 10 coincides with the reference axis AX of the optical system in the state shown in FIGS. 2A-2C, the optical axis of the objective lens 10 can shift from the reference axis AX due to the tracking operation.

As shown in FIGS. 2A-2C, each optical disc D1-D3 has a protective layer 21 and a record surface 22. Incidentally, the record surface 22 is sandwiched between the protective layer 21 and a label layer (not shown) in actual optical discs D1-D3.

Figure 3:
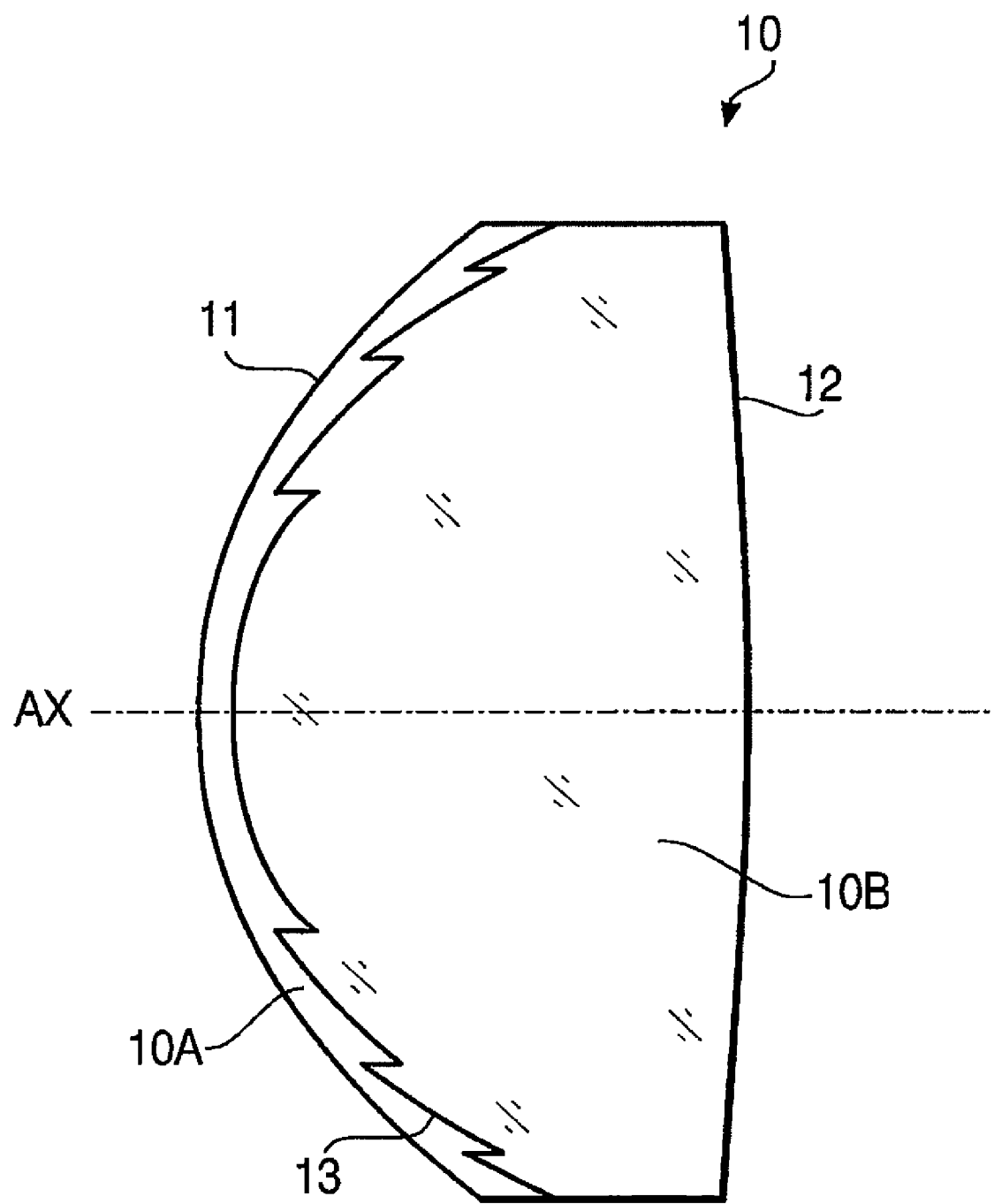
FIG. 3 is a schematic cross-sectional view of an example of a configuration of the objective lens.

FIG. 3 is a schematic cross-sectional view of the objective lens 10. As shown in FIG. 3, the objective lens 10 is formed by cementing two optical members 10A and 10B (made of different materials) together at a cementing surface 13. The objective lens 10 formed by the cementing has a first surface 11 (on the light source side) and a second surface 12, The objective lens 10 is a biconvex cemented lens made of plastic whose first, second and cementing surfaces 11, 12 and 13 are aspherical. The configuration of each aspherical surface can be expressed by the following expression:

$$X(h) = \frac{Ch^2}{1+\sqrt{1-(K+1)C^2h^2}} + \sum_{i=2} A_{2i}h^{2i}$$

where X(h) denotes a SAG amount of a coordinate point on the aspherical surface whose height (distance) from the optical axis is h (SAG amount: distance measured from a tangential plane contacting the aspherical surface on the optical axis), "C" denotes the curvature (1/r) of the aspherical surface on the optical axis, "K" denotes a cone constant, and each "$A_{2i}$" (i: integer larger than 1) denotes an aspherical coefficient of the 2i-th order (the summation in the expression includes aspherical coefficients $A_4, A_6, A_8, A_{10}, A_{12}, \ldots$ of the fourth order, sixth order, eighth order, tenth order, twelfth order, and so forth).

In cases where multiple laser beams of different wavelengths are used for various optical discs D1-D3 as in the optical information recording/reproducing device 100 of this embodiment, spherical aberration occurs due to variations in the refractive index of the objective lens 10 and the thickness of the protective layer 21 (which vary depending on which optical disc is used).

Therefore, in order to correct the spherical aberration (occurring in different ways when the three types of optical discs D1-D3 are used) and achieve the compatibility with the optical discs D1-D3, at least the cementing surface 13 of the objective lens 10 of this embodiment is provided with a phase shift structure having diffracting effects on the three types of light beams. The phase shift structure formed at the cementing surface 13 includes a plurality of concentric refracting surfaces (annular zones) around the optical axis AX and a plurality of minute steps each of which is formed between adjacent refracting surfaces.

The objective lens 10 according to the embodiment has the function of converging the first through third laser beams on the record surfaces of the corresponding optical discs (D1, D2, D3) respectively while correcting the spherical aberration to approximately 0 by the diffracting effect and refracting effect of the cementing surface 13 and refracting effects of the first and second surfaces 11 and 12.

The configuration of the phase shift structure of the objective lens 10 of this embodiment is specified by an optical path difference function which will be explained below. The optical path difference function represents the function of the objective lens 10 as a diffracting lens, in terms of an optical path length addition at each height h from the optical axis. The optical path difference function φ(h) can be expressed by the following expression:

$$\phi(h) = m\lambda \sum_{i=1} P_{2i} h^{2i}$$

In the above optical path difference function φ(h), each "$P_{2i}$" (i: positive integer) denotes a coefficient of the 2i-th order (the summation in the expression includes coefficients $P_2$, $P_4$, $P_6$, . . . of the second order, fourth order, sixth order, and so forth), "m" denotes the diffraction order maximizing the diffraction efficiency of the laser beam being used, and "λ" denotes the design wavelength of the laser beam being used.

To enhance the effectiveness of the function for correcting the spherical aberration, the objective lens 10 according to the embodiment is configured such that the phase shift structure formed on the cementing surface 13 satisfies the following conditions (1) and (2):

$$0.85 < \Phi2/\Phi1 < 1.15 \quad (1)$$

$$0.10 < |(\Phi3-\Phi2)/\Phi1| < 0.50 \quad (2)$$

where $\Phi1 = m(\lambda1) \times (\lambda1/(n2(\lambda1)-n1(\lambda1)))$, $\Phi2 = m(\lambda2) \times (\lambda2/(n2(\lambda2)-n1(\lambda2)))$, $\Phi3 = m(\lambda3) \times (\lambda3/(n2(\lambda3)-n1(\lambda3)))$, m(λ1), m(λ2), and m(λ3) are diffraction orders at which diffraction efficiencies of the first through third laser beams are maximized, respectively, n1(λ1), n1(λ2), and n1(λ3) are refractive indexes of the optical member 10A, respectively, and n2(λ1), n2(λ2), and n2(λ3) are refractive indexes of the optical member 10B, respectively.

Φ1, Φ2 and Φ3 correspond to the additional optical path lengths to be given to the first to third laser beams, respectively, by each step in the phase shift structure. That is, the condition (1) relates to a ratio between the additional optical path lengths respectively given to the first and second laser beams by the steps of the cementing surface 13. The condition (2) relates to a ratio among the additional optical path lengths respectively given to the first to third laser beams by the steps of the cementing surface 13.

With regard to the condition (1), when Φ2/Φ1 gets larger than the upper limit of the condition (1), the spherical aberration is brought to an overcorrected condition particularly when the second optical disc D2 is used. Further, when Φ2/Φ1 gets lower than the lower limit of the condition (1), the spherical aberration is brought to an undercorrected condition particularly when the second optical disc D2 is used.

With regard to the condition (2), when |(Φ3−Φ2)/Φ1| gets larger than the upper limit of the condition (2), the spherical aberration is brought to an overcorrected condition particularly when the third optical disc D3 is used. Further, when |(Φ3−Φ2)/Φ1| gets lower than the lower limit of the condition (2), the spherical aberration is brought to an undercorrected condition particularly when the third optical disc D3 is used.

When Φ2/Φ1 satisfies the following condition (3) (i.e., the additional optical path length given to the second laser beam by each step of the cementing surface 13 is larger than the additional optical path length given to the first laser beam by each step of the cementing surface 13), the objective lens 10 is configured to satisfy the following condition (4).

$$1.00 \leq \Phi2/\Phi1 < 1.15 \quad (3)$$

$$0.20 < |(\Phi3-\Phi2)/\Phi1| < 0.50 \quad (4)$$

By satisfying the following condition (5), the cementing surface 13 (which satisfies the condition (3)) is able to suitably suppress the spherical aberration caused when the wavelength of each laser beam (e.g., the first laser beam used for the first optical disc D1) deviates in a minute length from the optimum design wavelength.

$$0.20 < |(\Phi3-\Phi2)/\Phi1| < 0.40 \quad (5)$$

When Φ2/Φ1 satisfies the following condition (6) (i.e., the additional optical path length given to the first laser beam by each step of the cementing surface 13 is larger than the additional optical path length given to the second laser beam by each step of the cementing surface 13), the objective lens 10 is configured to satisfy the following condition (7).

$$0.85 < \Phi2/\Phi1 < 1.00 \quad (6)$$

$$0.20 < |(\Phi3-\Phi2)/\Phi1| < 0.35 \quad (7)$$

The upper and lower limits of the condition (6) and (7) have the same meanings as those of the upper and lower limits of the condition (3) and (4). As described above, by forming the phase shift structure on the cementing surface 13, it is possible to more effectively utilize the difference in an refractive index between the two optical members 10A and 10B of the objective lens 10 to achieve the above mentioned advantages of the embodiment, in comparison with the case where a phase shift structure is formed on an interface between a lens and air.

Figure 4:
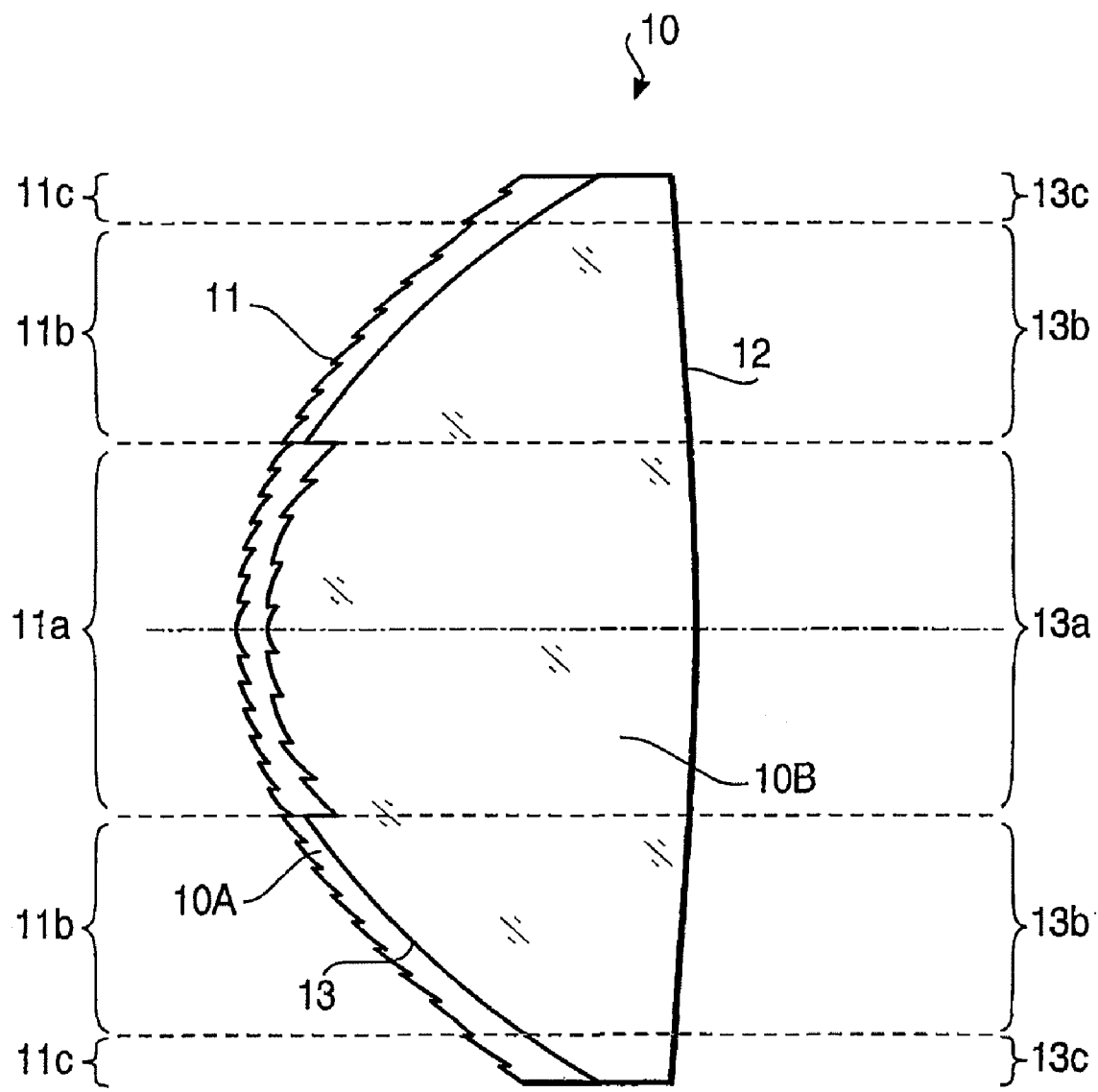
FIG. 4 is a schematic cross-sectional view of another example of a configuration of the objective lens.

As described above, according to the configuration of the objective lens 10 shown in FIG. 3 as an example, a single phase shift structure is formed on the cementing surface 13. However, the cementing surface 13 may be configured to be divided into a plurality of regions having different effects on the laser beam passing therethrough so that the reproduction or recordation can be performed more accurately. FIG. 4 shows another example of a configuration of the objective lens 10 according to the embodiment.

In the example of the objective lens 10 shown in FIG. 4, the cementing surface 13 has a first region 13a including the optical axis AX and a second region 13b located outside the first region 13a. When the diameter of the first laser beam incident on the first surface 11 of the objective lens 10 and the diameter of the second laser beam incident on the first surface 11 of the objective lens 10 are different from each other, a fifth region 13c is provided outside the second region 13b. In the first region 13a, a phase shift structure, contributing to converging each of the first to third laser beams respectively used for the reproduction or recordation for the first through third optical discs D1 to D3, is formed. The phase shift structure formed in the first region 13a satisfies the above mentioned conditions (1) to (7). Hereafter, the phase shift structure formed in the first region 13a is referred to as a "first phase shift structure".

The second region 13b is configured to suitably correct the spherical aberration for each of the first and second laser beams so that the first and second laser beams are suitably converged on the record surfaces of the first and second optical discs, respectively. As described above, the objective lens 10 is formed of two optical members 10A and 10B having refractive indexes different from each other. Therefore, by forming the optical members 10A and 10B of materials having properties (i.e., refractive indexes) of correcting the spherical aberrations for the first and second laser beams, it is possible to enhance the use efficiency of each of the first and second laser beams while suppressing the spherical aberration.

The second region 13b may be provided with a phase shift structure (a third phase shift structure) which does not contribute to convergence of the third laser beam but contributes to converging the first and second laser beams on the record surfaces of the first and second optical discs, respectively.

The fifth region 13c is formed when the following condition (8) stands:

$$f1 \times NA1 > f2 \times NA2 \quad (8)$$

where f1 represents a focal length defined when the first optical disc D1 is used, and f2 represents a focal length defined when the second optical disc D2 is used. In other words, the fifth region 13c is formed when the diameter of the first laser beam on the incident surface of the objective lens 10 is larger than the diameter of the second laser beam on the incident surface of the objective lens 10. The fifth region 13c is formed to have the function of suitably correcting the spherical aberration relating to the first laser beam so that each of the first to third laser beams is suitably converged on the record surface of the corresponding optical disc.

In contrast to the second region 13b, the fifth region 13c formed when the condition (8) stands does not contribute to convergence of the second laser beam. That is, the fifth region 13c formed when the condition (8) stands has the function as an aperture stop for the second and third laser beams. For example, if a phase shift structure (a fifth phase shift structure) is provided on the fifth region 13c, the fifth phase shift structure is designed such that an optical path length difference given to the first laser beam by each step between adjacent refraction surface zones is different from an optical path length difference given to the first laser beam in the second region 13c. More specifically, the fifth phase shift structure is blazed so that the diffraction efficiency for the first laser beam is maximized.

Alternatively, the fifth region 13c may be formed when the following condition (9) stands.

$$f1 \times NA1 < f2 \times NA2 \quad (9)$$

In other words, the fifth region 13c is formed when the diameter of the second laser beam on the incident surface of the objective lens 10 is larger than the diameter of the first laser beam on the incident surface of the objective lens 10. The fifth region 13c is formed to have the function of suitably correcting the spherical aberration relating to the second laser beam so that each of the first to third laser beams is suitably converged on the record surface of the corresponding optical disc.

In contrast to the second region 13b, the fifth region 13c formed when the condition (9) stands does not contribute to convergence of the first laser beam. That is, the fifth region 13c formed when the condition (9) stands has the function as an aperture stop for the first and third laser beams. For example, if a phase shift structure (a fifth phase shift structure) is provided on the fifth region 13c, the fifth phase shift structure is designed such that an optical path length difference given to the second laser beam by each step between adjacent refraction surface zones is different from an optical path length difference given to the second laser beam in the second region 13b. More specifically, the fifth phase structure is blazed so that the diffraction efficiency for the second laser beam is maximized.

To suppress the spherical aberration caused due to a change in wavelength or to give the function as an aperture stop for the third laser beam to the objective lens 10, the objective lens 10 may be configured such that the first surface 11 or the second surface 12 (i.e., an interface between a lens and air) is divided into a plurality of regions respectively provided with different phase shift structures.

However, it is preferable that the phase shift structure is provided on the first surface 11 because there is a possibility that the objective lens 10 is situated at a position adjacent to the optical disc placed on the turn table during the focusing operation. As shown in FIG. 4, the first surface 11 is divided into three regions 11a, 11b and 11c (third, forth and sixth regions) by boundaries of which heights from the optical axis are the same as those of the respective boundaries defining the first, second and fifth regions 13a, 13b and 13c on the cementing surface 13. That is, the third region 11a corresponds to the first region 13a, the fourth region 11b corresponds to the second region 13b, and the sixth region 11c corresponds to the fifth region 13c. Therefore, if the objective lens 10 is configured such that a single phase shift structure is formed on the entire region on the cementing surface 13 (i.e., if the cementing surface is constituted only by the first region 13a as shown in FIG. 3), only the third region 11a is formed on an interface (e.g., the first surface 11) between a lens and air.

On the third region 11a, a phase shift structure (a second phase shift structure) having the function of giving an additional optical path length substantially equal to $2\lambda_1$ (where $\lambda_1$ represents a wavelength of the first laser beam) to the first laser beam is provided. Consequently, a ratio among diffraction orders at which the diffraction efficiencies of the first, second and third laser beams take respective maximum values is represented by 2:1:1 for the first to third beams in this order. In this case, high diffraction efficiencies can be achieved respectively for the first to third laser beams. Regarding the information recording or reproducing for each of the first to third optical discs D1 to D3, it is also possible to achieve the function of correcting the spherical aberration caused when the wavelength of the laser beam emitted by the light source shifts from the design wavelength, while maintaining high use efficiency of light.

On the fourth region 11b, a phase shift structure (a fourth phase shift structure), having the function of suitably converging the first and second laser beams onto the record surfaces of the first and second optical discs D1 and D2, respectively, and not contributing to the convergence of the third laser beam, is formed. By this structure, the objective lens 10 is provided with the function as an aperture stop for the third laser beam. Therefore, by forming the fourth phase shift structure, the need for an aperture stop can be eliminated.

More specifically, the fourth phase shift structure configured as above has a step structure giving an additional optical path length substantially equal to $3\lambda_1$ or $5\lambda_1$ to the first laser beam. By this structure, it becomes possible to enhance the diffraction efficiencies for the first and second laser beams while achieving the function of correcting the spherical aberration caused when the laser beam emitted by each of the light sources 1A, 1B and 1C shifts from the design wavelength.

The sixth region 11c is formed when the following condition (8) stands:

$$f1 \times NA1 > f2 \times NA2 \quad (8)$$

where f1 represents a focal length defined when the first optical disc D1 is used, and f2 represents a focal length defined when the second optical disc D2 is used. In other words, the sixth region 11c is formed when the diameter of the first laser beam on the incident surface of the objective lens 10 is larger than the diameter of the second laser beam on the incident surface of the objective lens 10.

In contrast to the fourth region 11b, the sixth region 11c formed when the condition (8) stands has a phase shift structure (a sixth phase shift structure) not contributing to convergence of the second laser beam. That is, the sixth region 11c formed when the condition (8) stands has the function as an aperture stop for the second and third laser beams. More specifically, the sixth phase shift structure is designed such that an optical path length difference given to the first laser beam by each step between adjacent refraction surface zones is different from an optical path length difference given to the first laser beam in the fourth region 11b. The sixth phase structure is blazed so that the diffraction efficiency for the first laser beam is maximized.

Alternatively, the sixth region 11c is formed when the following condition (9) stands.

$$f1 \times NA1 < f2 \times NA2 \quad (9)$$

In other words, the sixth region 11c is formed when the diameter of the second laser beam on the incident surface of the objective lens 10 is larger than the diameter of the first laser beam on the incident surface of the objective lens 10.

In contrast to the fourth region 11b, the sixth region 11c formed when the condition (9) stands has a phase shift structure (a sixth phase shift structure) not contributing to convergence of the first laser beam. That is, the sixth region 11c formed when the condition (9) stands has the function as an aperture stop for the first and third laser beams. More specifically, the sixth phase shift structure is designed such that an optical path length difference given to the second laser beam by each step between adjacent refraction surface zones is different from an optical path length difference given to the second laser beam in the fourth region 11b. The sixth phase structure is blazed so that the diffraction efficiency for the second laser beam is maximized.

As described above, according to the embodiment, a phase shift structure may be provided on any of the first to sixth regions. However, as long as the first region 13a is provided with the first phase shift structure, the other regions do not necessarily require a phase shift structure. In other words, regarding the second to sixth regions, whether to form a phase shift structure on the region may be determined considering various viewpoints such as the easiness of the design of the objective lens 10 or the required optical performance of the objective lens 10.

To achieve the easiness of manufacturing of the objective lens 10, the objective lens 10 may be configured to achieve the following condition (10):

$$0.01 < d1/d2 < 0.20 \quad (10)$$

where d1 represents a center thickness of the first optical member 10A (unit: mm), and d2 represents a center thickness of the second optical member 10B (unit: mm).

Hereafter, five concrete examples (first to fifth examples) according to the above mentioned embodiment are described. The objective lens 10 according to each of the first and second examples has the configuration shown in FIG. 3, and the objective lens 10 according to each of the third to fifth examples has the configuration shown in FIG. 4. In the following examples, the optical disc D1 having the highest data density has the protective layer thickness of 0.6 mm, the optical disc D2 having the second highest data density has the protective layer thickness of 0.6 mm, and the optical disc D3 having the lowest data density has the protective layer thickness of 1.2 mm.

FIRST EXAMPLE

The following Table 1 shows concrete specifications of the objective lens 10 according to a first example.

TABLE 1

|  | $1^{st}$ laser beam | $2^{nd}$ laser beam | $3^{rd}$ laser beam |
|---|---|---|---|
| Wavelength (nm) | 405 | 660 | 790 |
| Focal Length (mm) | 3.00 | 3.10 | 3.12 |
| NA | 0.65 | 0.63 | 0.51 |
| Magnification M | 0.000 | 0.000 | 0.000 |

As indicated by the "Maginfication M" in Table 1, the laser beam is incident upon the objective lens 10 as a collimated beam for all of the first to third optical discs D1 to D3. The following Table 2 shows specific numerical configuration defined when the first optical disc D1 is used in the optical information recording/reproducing device 100 provided with the objective lens 10 having the specifications shown in Table 1. The following Table 3 shows specific numerical configuration defined when the second optical disc D2 is used in the optical information recording/reproducing device 100 provided with the objective lens 10 having the specifications shown in Table 1. The following Table 4 shows specific numerical configuration defined when the third optical disc D3 is used in the optical information recording/reproducing device 100 provided with the objective lens 10 having the specifications shown in Table 1.

TABLE 2

| Surface No. | r | d | n (405 nm) | REMARKS |
|---|---|---|---|---|
| 0 |  | ∞ |  | Light Source |
| 1 | 1.980 | 0.10 | 1.53212 | Objective Lens |
| 2 | 1.407 | 2.20 | 1.56023 |  |
| 3 | −7.176 | 1.36 |  |  |
| 4 | ∞ | 0.60 | 1.62231 | Optical Disc |
| 5 | ∞ | — |  |  |

TABLE 3

| Surface No. | r | d | n (660 nm) | REMARKS |
|---|---|---|---|---|
| 0 |  | ∞ |  | Light Source |
| 1 | 1.980 | 0.10 | 1.51073 | Objective Lens |
| 2 | 1.407 | 2.20 | 1.54044 |  |
| 3 | −7.176 | 1.43 |  |  |
| 4 | ∞ | 0.60 | 1.57961 | Optical Disc |
| 5 | ∞ | — |  |  |

TABLE 4

| Surface No. | r | d | n (790 nm) | REMARKS |
|---|---|---|---|---|
| 0 |  | ∞ |  | Light Source |
| 1 | 1.980 | 0.10 | 1.50741 | Objective Lens |

TABLE 4-continued

| Surface No. | r | d | n (790 nm) | REMARKS |
|---|---|---|---|---|
| 2 | 1.407 | 2.20 | 1.53653 | |
| 3 | −7.176 | 1.07 | | |
| 4 | ∞ | 1.20 | 1.57307 | Optical Disc |
| 5 | ∞ | — | | |

In Tables 2 to 4, "r" denotes the curvature radius [mm] of each optical surface, "d" denotes the distance [mm] from each optical surface to the next optical surface during the information reproduction/recordation, "n (X nm)" denotes the refractive index of a medium between each optical surface and the next optical surface for a wavelength of X nm (ditto for the similar Tables explained later).

As shown in the "REMARKS" in Tables 2 to 4 (and in the following similar Tables), the surface No. 0 represents the light source (1A-1C), the surface No. 1 represents the first surface 11 of the objective lens 10, the surface No. 2 represents the cementing surface 13 of the objective lens 10, the surface No. 3 represents the second surface 12 of the objective lens 10, the surface No. 4 represents the surface of the protective layer 21 of the optical disc (D1-D3), and the surface No. 5 represents the record surface 22 of the optical disc (D1-D3). Incidentally, numerical configurations of optical members (elements) placed between each light source (1A-1C) and the objective lens 10 are omitted in Tables 2 to 4 for convenience of explanation.

The first surface 11, the cementing surface 13 and the second surface 12 of the objective lens 10 (surfaces Nos. 1, 2 and 3) are aspherical surfaces. The following Table 5 shows the cone constant and aspherical coefficients specifying the shape of each aspherical surface (11, 12, 13). Incidentally, the notation "E" in Table 5 (and in the following similar Tables) means the power of 10 with an exponent specified by the number to the right of E (e.g. "E-04" means "×10$^{-4}$").

TABLE 5

| Surface No. | K | A4 | A6 | A8 | A10 | A12 |
|---|---|---|---|---|---|---|
| 1 | −0.6800 | 6.9820E−04 | 3.6170E−03 | −2.4400E−03 | 7.3960E−04 | −8.1307E−05 |
| 2 | −0.6800 | 1.5010E−02 | −9.6920E−02 | 5.8340E−02 | −1.6570E−02 | 1.8814E−03 |
| 3 | 0.0000 | 2.3280E−02 | −7.7780E−03 | 4.6600E−03 | −1.9510E−03 | 2.6691E−04 |

The objective lens 10 according to the first example is provided with a phase shift structure (corresponding to the first phase shift structure) on the entire region of the cementing surface 13. The following Table 6 shows the coefficients $P_{2i}$ (i: positive integer) of the optical path difference function specifying the phase shift structure of the objective lens 10 according to the first example. Table 7 shows diffraction orders at which the first to third laser beams take the respective maximum diffraction efficiencies.

TABLE 6

| Surface No. | P2 | P4 | P6 | P8 | P10 | P12 |
|---|---|---|---|---|---|---|
| 2 | 0.0000E+00 | −9.6680E−01 | −4.7270E−01 | 1.0280E−01 | 0.0000E+00 | 0.0000E+00 |

TABLE 7

| | 1$^{st}$ laser beam | 2$^{nd}$ laser beam | 3$^{rd}$ laser beam |
|---|---|---|---|
| Diffraction Order m | 3 | 2 | 2 |

As can be seen from the above described Tables, Φ1=0.043, Φ2=0.044, and Φ3=0.054, and Φ2/Φ1=1.023, and |(Φ3−Φ2)/Φ1|=0.233. Therefore, all of the conditions (1) to (5) are satisfied. Table 8 shows the diffraction efficiencies respectively defined when the first to third laser beams (the optical discs D1 to D3) are used in the optical information recording/reproducing device 100 having the objective lens 10 according to the first example. As a comparative example ("Comparative Example 1" in Table 8), Table 8 also shows diffraction efficiencies, regarding a conventional single-element objective lens, respectively defined when the first to third laser beams (the optical discs D1 to D3) are used.

TABLE 8

| | First Example | Comparative Example 1 |
|---|---|---|
| 1$^{st}$ lease beam | 100.0% | 100.0% |
| 2$^{nd}$ laser beam | 99.5% | 84.6% |
| 3$^{rd}$ laser beam | 58.0% | 36.5% |

As shown in Table 8, regarding the second and third optical discs D2 and D3, the first example achieves the diffraction efficiencies higher than those provided by the comparative example 1. Therefore, the first example achieves a high use efficiency of light for each of the first to third laser beams (i.e., the first to third optical discs D1 to D3).

FIG. 5A is a graph illustrating the spherical aberration caused when the first laser beam is used in the optical information recording/reproducing device 100 provided with the objective lens 10 according to the first example. FIG. 5B is a graph illustrating the spherical aberration caused when the second laser beam is used in the optical information recording/reproducing device 100 provided with the objective lens 10 according to the first example. FIG. 5C is a graph illustrating the spherical aberration caused when the third laser beam is used in the optical information recording/reproducing device 100 provided with the objective lens 10 according to the first example. In FIGS. 5A to 5C (and in the following similar drawings), a solid line represents the spherical aberration caused when the laser beam having the wavelength shown in Table 1 is incident on the objective lens 10, and a dashed line represents the spherical aberration caused when the laser beam of which wavelength shifts from the wavelength shown in Table 1 by 5 nm.

As shown by the solid lines in FIGS. 5A to 5C, the spherical aberration can be suitably corrected for each of the optical discs D1 to D3. That is, by employing the objective lens 10 according to the first example, it becomes possible to suitably converge the first to third laser beams on the record surfaces of the first to third optical discs D1 to D3, respectively.

As can be seen from the dashed lines in FIGS. 5A to 5C, it is also possible to prevent the spherical aberration from being caused by the minute wavelength shift of the laser beam emitted by each of the light sources 1A to 1C. That is, by employing the objective lens 10 according to the first example, it is possible to keep the suitable convergence state for each of the first to third laser beams even if the wavelength of the laser beam shifts by a minute amount. It should be noted that the shift of the dashed line (representing the spherical aberration) in the lateral direction in each of FIGS. 5A to 5C do not cause any problem in regard to the focusing operation because such a shift of the spherical aberration in the lateral direction can be corrected by adjusting the position of the objective lens 10 or the optical disc in the direction of the optical axis.

As shown in Tables 2 to 4, the center thickness d1 of the first optical member 10A is 0.10, and the center thickness d2 of the second optical member 10B is 2.20. In this case, d1/d2 is 0.045. Therefore, the objective lens 10 according to the first example satisfies the condition (10).

SECOND EXAMPLE

The following Table 9 shows concrete specifications of the objective lens 10 according to a second example.

TABLE 9

|  | 1$^{st}$ laser beam | 2$^{nd}$ laser beam | 3$^{rd}$ laser beam |
|---|---|---|---|
| Wavelength (nm) | 405 | 660 | 790 |
| Focal Length (mm) | 3.00 | 3.10 | 3.12 |
| NA | 0.65 | 0.60 | 0.51 |
| Magnification M | 0.000 | 0.000 | 0.000 |

As indicated by the "Maginfication M" in Table 9, the laser beam is incident upon the objective lens 10 as a collimated beam for all of the first to third optical discs D1 to D3. The following Table 10 shows specific numerical configuration defined when the first optical disc D1 is used in the optical information recording/reproducing device 100 provided with the objective lens 10 having the specifications shown in Table 9. The following Table 11 shows specific numerical configuration defined when the second optical disc D2 is used in the optical information recording/reproducing device 100 provided with the objective lens 10 having the specifications shown in Table 9. The following Table 12 shows specific numerical configuration defined when the third optical disc D3 is used in the optical information recording/reproducing device 100 provided with the objective lens 10 having the specifications shown in Table 9.

TABLE 10

| Surface No. | r | d | n (405 nm) | REMARKS |
|---|---|---|---|---|
| 0 | ∞ |  |  | Light Source |
| 1 | 1.980 | 0.10 | 1.53212 | Objective Lens |
| 2 | 1.785 | 2.50 | 1.56023 |  |
| 3 | −6.012 | 1.21 |  |  |
| 4 | ∞ | 0.60 | 1.62231 | Optical Disc |
| 5 | ∞ | — |  |  |

TABLE 11

| Surface No. | r | d | n (660 nm) | REMARKS |
|---|---|---|---|---|
| 0 | ∞ |  |  | Light Source |
| 1 | 1.980 | 0.10 | 1.51073 | Objective Lens |
| 2 | 1.785 | 2.50 | 1.54044 |  |
| 3 | −6.012 | 1.29 |  |  |
| 4 | ∞ | 0.60 | 1.57961 | Optical Disc |
| 5 | ∞ | — |  |  |

TABLE 12

| Surface No. | r | d | n (790 nm) | REMARKS |
|---|---|---|---|---|
| 0 | ∞ |  |  | Light Source |
| 1 | 1.980 | 0.10 | 1.50741 | Objective Lens |
| 2 | 1.785 | 2.50 | 1.53653 |  |
| 3 | −6.012 | 0.92 |  |  |
| 4 | ∞ | 1.20 | 1.57307 | Optical Disc |
| 5 | ∞ | — |  |  |

The first surface 11, the cementing surface 13 and the second surface 12 of the objective lens 10 (surfaces Nos. 1, 2 and 3) are aspherical surfaces. The following Table 13 shows the cone constant and aspherical coefficients specifying the shape of each aspherical surface (11, 12, 13).

TABLE 13

| Surface No. | K | A4 | A6 | A8 | A10 | A12 |
|---|---|---|---|---|---|---|
| 1 | −0.6800 | −1.0190E−03 | 3.7870E−04 | −5.4360E−04 | 1.9960E−04 | −2.5362E−05 |
| 2 | −0.6800 | 1.5860E−02 | 2.8550E−03 | 6.9600E−03 | −2.6050E−03 | 3.4880E−04 |
| 3 | 0.0000 | 3.0000E−02 | −3.7090E−03 | −1.8070E−03 | 4.0830E−04 | 8.3100E−07 |

The objective lens 10 according to the second example is provided with a phase shift structure (corresponding to the first phase shift structure) on the entire region of the cementing surface 13. The following Table 14 shows the coefficients $P_{2i}$; (i: positive integer) of the optical path difference function specifying the phase shift structure of the objective lens 10 according to the second example. Table 15 shows diffraction orders at which the first to third laser beams take the respective maximum diffraction efficiencies.

TABLE 14

| Surface No. | P2 | P4 | P6 | P8 | P10 | P12 |
|---|---|---|---|---|---|---|
| 2 | 0.0000E+00 | −9.1150E−01 | 3.3250E−02 | −7.7680E−02 | 0.0000E+00 | 0.0000E+00 |

TABLE 15

|  | 1st laser beam | 2nd laser beam | 3rd laser beam |
|---|---|---|---|
| Diffraction Order m | 5 | 3 | 3 |

As can be seen from the above described Tables, $\Phi 1=0.072$, $\Phi 2=0.067$, and $\Phi 3=0.081$, and $\Phi 2/\Phi 1=0.931$, and $|(\Phi 3-\Phi 2)/\Phi 1|=0.194$. Therefore, the conditions (1), (2), (4) to (7) are satisfied. Table 16 shows the diffraction efficiencies respectively defined when the first to third laser beams (the optical discs D1 to D3) are used in the optical information recording/reproducing device 100 having the objective lens 10 according to the second example. As a comparative example ("Comparative Example 2" in Table 16), Table 16 also shows diffraction efficiencies, regarding a conventional single-element objective lens, respectively defined when the first to third laser beams (the optical discs D1 to D3) are used.

TABLE 16

|  | Second Example | Comparative Example 2 |
|---|---|---|
| 1st lease beam | 100.0% | 100.0% |
| 2nd laser beam | 78.0% | 99.5% |
| 3rd laser beam | 69.5% | 33.4% |

As can be seen from Table 16, the diffraction efficiency defined when the second laser beam (i.e., the second optical disc D2) is used in the second example is slightly lower than the diffraction efficiency defined when the second laser beam (i.e., the second optical disc D2) is used in the comparative example 2. However, the diffraction efficiency for the third optical disc D3 achieved in the second example is twice as large as the diffraction efficiency for the third laser beam achieved in the comparative example 2. Therefore, according to the second example, the use efficiency of light can be maintained at a high level for all of the optical discs D1 to D3 while achieving the compatibility with the three types of optical discs.

FIG. 6A is a graph illustrating the spherical aberration caused when the first laser beam is used in the optical information recording/reproducing device 100 provided with the objective lens 10 according to the second example. FIG. 6B is a graph illustrating the spherical aberration caused when the second laser beam is used in the optical information recording/reproducing device 100 provided with the objective lens 10 according to the second example. FIG. 6C is a graph illustrating the spherical aberration caused when the third laser beam is used in the optical information recording/reproducing device 100 provided with the objective lens 10 according to the second example.

As shown by the solid lines in FIGS. 6A to 6C, the spherical aberration can be suitably corrected for each of the optical discs D1 to D3. That is, by employing the objective lens 10 according to the second example satisfying the conditions (1), (2) and (4) to (7), it becomes possible to suitably converge the first to third laser beams (having the respective design wavelengths) on the record surfaces of the first to third optical discs D1 to D3, respectively.

As can be seen from the dashed lines in FIGS. 6A to 6C, it is also possible to prevent the spherical aberration from being caused by the minute wavelength shift of the laser beam emitted by each of the light sources 1A to 1C. That is, by employing the objective lens 10 according to the second example, it is possible to keep the suitable convergence state for each of the first to third laser beams even if the wavelength of the laser beam shifts by a minute amount.

As shown in Tables 10 to 12, the center thickness d1 of the first optical member 10A is 0.10, and the center thickness d2 of the second optical member 10B is 2.50. In this case, d1/d2 is 0.040. Therefore, the objective lens 10 according to the second example also satisfies the condition (8).

THIRD EXAMPLE

The objective lens 10 according to a third example is a modification of the objective lens 10 according to the second example. As described below, the objective lens 10 according to the third example is provided with a diffraction structure (i.e., the second phase shift structure) on the first surface 11 to enhance the optical performance. The following Table 17 shows concrete specifications of the objective lens 10 according to the third example.

TABLE 17

|  | 1st laser beam | 2nd laser beam | 3rd laser beam |
|---|---|---|---|
| Wavelength (nm) | 405 | 660 | 790 |
| Focal Length (mm) | 3.00 | 3.10 | 3.12 |
| NA | 0.65 | 0.60 | 0.51 |
| Magnification M | 0.000 | 0.000 | 0.000 |

The following Table 18 shows specific numerical configuration defined when the first optical disc D1 is used in the optical information recording/reproducing device 100 provided with the objective lens 10 having the specifications shown in Table 17. The following Table 19 shows specific numerical configuration defined when the second optical disc D2 is used in the optical information recording/reproducing device 100 provided with the objective lens 10 having the specifications shown in Table 17. The following Table 20 shows specific numerical configuration defined when the third optical disc D3 is used in the optical information recording/reproducing device 100 provided with the objective lens 10 having the specifications shown in Table 17.

TABLE 18

| Surface No. | r | d | n (405 nm) | REMARKS |
|---|---|---|---|---|
| 0 | ∞ | ∞ | | Light Source |
| 1 | 1.950 | 0.30 | 1.53212 | Objective Lens |
| 2 | 1.762 | 2.30 | 1.56023 | |
| 3 | −6.449 | 1.20 | | |
| 4 | ∞ | 0.60 | 1.62231 | Optical Disc |
| 5 | ∞ | — | | |

TABLE 19

| Surface No. | r | d | n (660 nm) | REMARKS |
|---|---|---|---|---|
| 0 | ∞ | ∞ | | Light Source |
| 1 | 1.950 | 0.30 | 1.51073 | Objective Lens |
| 2 | 1.762 | 2.30 | 1.54044 | |
| 3 | −6.449 | 1.27 | | |
| 4 | ∞ | 0.60 | 1.57961 | Optical Disc |
| 5 | ∞ | — | | |

TABLE 20

| Surface No. | r | d | n(790 nm) | REMARKS |
|---|---|---|---|---|
| 0 | ∞ | ∞ | | Light Source |
| 1 | 1.950 | 0.30 | 1.50741 | Objective Lens |
| 2 | 1.762 | 2.30 | 1.53653 | |
| 3 | −6.449 | 0.91 | | |
| 4 | ∞ | 1.20 | 1.57307 | Optical Disc |
| 5 | ∞ | — | | |

The first surface 11, the cementing surface 13 and the second surface 12 of the objective lens 10 (surfaces Nos. 1, 2 and 3) are aspherical surfaces. The following Table 21 shows the cone constant and aspherical coefficients specifying the shape of each aspherical surface (11, 12, 13).

TABLE 21

| Surface No. | K | A4 | A6 | A8 | A10 | A12 |
|---|---|---|---|---|---|---|
| 1 | −0.6800 | 2.9560E−03 | 2.1980E−04 | −4.5560E−04 | 1.8280E−04 | −1.9160E−05 |
| 2 | −0.6800 | −4.4390E−02 | −2.9000E−04 | 9.0560E−03 | −3.0310E−03 | 3.1840E−04 |
| 3 | 0.0000 | 3.2720E−02 | −2.7370E−03 | −1.9090E−03 | 3.1140E−04 | 2.9000E−05 |

The objective lens 10 according to the third example is provided with a phase shift structure (corresponding to the above mentioned first phase shift structure) on the entire region of the cementing surface 13 and a phase shift structure (corresponding to the above mentioned second phase shift structure) on the entire region of the first surface 11. The following Table 22 shows the coefficients $P_{2i}$ (i: positive integer) of the optical path difference function specifying the phase shift structure of the objective lens 10 according to the third example. Table 23 shows diffraction orders at which the first to third laser beams take the respective maximum diffraction efficiencies.

TABLE 22

| Surface No. | P2 | P4 | P6 | P8 | P10 | P12 |
|---|---|---|---|---|---|---|
| 1 | 0.0000E+00 | 1.1030E+00 | −2.8080E−02 | −5.6000E−03 | 0.0000E+00 | 0.0000E+00 |
| 2 | 0.0000E+00 | −1.3230E+00 | −1.2630E−01 | 2.8800E−02 | 0.0000E+00 | 0.0000E+00 |

TABLE 23

| Surface No. | 1st laser beam | 2nd laser beam | 3rd laser beam |
|---|---|---|---|
| 1 | 2 | 1 | 1 |
| 2 | 5 | 3 | 3 |

As can be seen from the above described Tables, $\Phi 1=0.072$, $\Phi 2=0.067$, and $\Phi 3=0.081$, and $\Phi 2/\Phi 1=0.931$, and $|(\Phi 3-\Phi 2)/\Phi 1|=0.194$. Therefore, the conditions (1), (2), (4) to (7) are satisfied. Table 24 shows the diffraction efficiencies respectively defined when the first to third laser beams (the optical discs D1 to D3) are used in the optical information recording/reproducing device 100 having the objective lens 10 according to the third example. As a comparative example ("Comparative Example 2" in Table 24), Table 24 also shows diffraction efficiencies, regarding a conventional single-element objective lens, respectively defined when the first to third laser beams (the optical discs D1 to D3) are used.

TABLE 24

| | Third Example | Comparative Example 2 |
|---|---|---|
| 1st lease beam | 100.0% | 100.0% |
| 2nd laser beam | 78.0% | 99.5% |
| 3rd laser beam | 69.5% | 33.4% |

As can be seen from Table 24, although the diffraction efficiency defined when the second optical disc D2 is used in the third example is slightly lower than the diffraction efficiency defined when the second optical disc is used in the comparative example 2, the diffraction efficiency defined when the third optical disc D3 is used in the third example is approximately two times as large as the diffraction efficiency defined when the third optical disc D3 is used in the comparative example 2. Therefore, the objective lens 10 according to the third example is able to achieve the compatibility with the first to third optical discs D1 to D3 while maintaining the high use efficiency of light for each of the first to third laser beams.

FIG. 7A is a graph illustrating the spherical aberration caused when the first laser beam is used in the optical information recording/reproducing device 100 provided with the objective lens 10 according to the third example. FIG. 7B is a graph illustrating the spherical aberration caused when the second laser beam is used in the optical information recording/reproducing device 100 provided with the objective lens 10 according to the third example. FIG. 7C is a graph illustrating the spherical aberration caused when the third laser beam is used in the optical information recording/reproducing device 100 provided with the objective lens 10 according to the third example.

As shown by the solid lines in FIGS. 7A to 7C, the spherical aberration can be suitably corrected for each of the optical discs D1 to D3. That is, by employing the objective lens 10 according to the third example, it becomes possible to suitably converge the first to third laser beams (having the respective design wavelengths) on the record surfaces of the first to third optical discs D1 to D3, respectively.

As can be seen from the dashed lines in FIGS. 7A to 7C, it is also possible to keep the spherical aberration, caused by the minute wavelength shift of the laser beam emitted by each of the light sources 1A to 1C, at a small level. That is, by employing the objective lens 10 according to the third example, it is possible to keep the suitable convergence state for each of the first to third laser beams even if the wavelength of the laser beam shifts by a minute amount.

As shown in Tables 18 to 20, the center thickness d1 of the first optical member 10A is 0.30, and the center thickness d2 of the second optical member 10B is 2.30. In this case, d1/d2 is 0.130. Therefore, the objective lens 10 according to the third example also satisfies the condition (10).

FOURTH EXAMPLE

The objective lens 10 according to a fourth example is designed based on the configurations shown in the above mentioned second and third examples. More specifically, on the first surface 11 of the objective lens 10 according to the fourth example, the third region having the second phase shift structure is provided and the fourth region having the fourth phase shift structure is provided outside the third region. The following Table 25 shows concrete specifications of the objective lens 10 according to the fourth example.

TABLE 25

|  | $1^{st}$ laser beam | $2^{nd}$ laser beam | $3^{rd}$ laser beam |
|---|---|---|---|
| Wavelength (nm) | 405 | 660 | 790 |
| Focal Length (mm) | 3.00 | 3.10 | 3.12 |
| NA | 0.65 | 0.60 | 0.51 |
| Magnification M | 0.000 | 0.000 | 0.000 |

The following Table 26 shows specific numerical configuration defined when the first optical disc D1 is used in the optical information recording/reproducing device 100 provided with the objective lens 10 having the specifications shown in Table 25. The following Table 27 shows specific numerical configuration defined when the second optical disc D2 is used in the optical information recording/reproducing device 100 provided with the objective lens 10 having the specifications shown in Table 25. The following Table 28 shows specific numerical configuration defined when the third optical disc D3 is used in the optical information recording/reproducing device 100 provided with the objective lens 10 having the specifications shown in Table 25.

TABLE 26

| Surface No. | r | d | n(405 nm) |  |
|---|---|---|---|---|
| 0 |  | ∞ |  | Light Source |
| 1($3^{rd}$ region) | 1.980 | 0.10 | 1.53212 | Objective Lens |
| 1($4^{th}$ region) | 1.980 |  |  |  |
| 2 | 1.785 | 2.50 | 1.56023 |  |
| 3 | −6.012 | 1.21 |  |  |
| 4 | ∞ | 0.60 | 1.62231 | Optical Disc |
| 5 | ∞ | — |  |  |

TABLE 27

| Surface No. | r | d | n(660 nm) |  |
|---|---|---|---|---|
| 0 |  | ∞ |  | Light Source |
| 1($3^{rd}$ region) | 1.980 | 0.10 | 1.51073 | Objective Lens |
| 1($4^{th}$ region) | 1.980 |  |  |  |
| 2 | 1.785 | 2.50 | 1.54044 |  |
| 3 | −6.012 | 1.29 |  |  |
| 4 | ∞ | 0.60 | 1.57961 | Optical Disc |
| 5 | ∞ | — |  |  |

TABLE 28

| Surface No. | r | d | n(790 nm) |  |
|---|---|---|---|---|
| 0 |  | ∞ |  | Light Source |
| 1($3^{rd}$ region) | 1.980 | 0.10 | 1.50741 | Objective Lens |
| 1($4^{th}$ region) | 1.980 |  |  |  |
| 2 | 1.785 | 2.50 | 1.53653 |  |
| 3 | −6.012 | 0.92 |  |  |
| 4 | ∞ | 1.20 | 1.57307 | Optical Disc |
| 5 | ∞ | — |  |  |

In Tables 26 to 28, surface No. 0 represents the light source (1A, 1B, 1C), surface No. 1 represents the first surface 11 of the objective lens 10, surface No. 2 represents the cementing surface 13 of the objective lens 10, surface No. 3 represents the second surface 12 of the objective lens 10, and surfaces Nos. 4 and 5 represent the protective layer 21 and the record surface 22 of the optical disc. In each of the Tables 26 to 28, two separate columns for the $3^{rd}$ and $4^{th}$ regions are assigned to surface No. 1.

The first surface 11, the cementing surface 13 and the second surface 12 of the objective lens 10 (surfaces Nos. 1, 2 and 3) are aspherical surfaces. The following Table 29 shows the cone constant and aspherical coefficients specifying the shape of each aspherical surface (11, 12, 13).

TABLE 29

| Surface No. | K | A4 | A6 | A8 | A10 | A12 |
|---|---|---|---|---|---|---|
| 1 ($3^{rd}$ region) | −0.6800 | −1.9360E−02 | 7.4830E−03 | −2.4860E−04 | −2.0240E−04 | 8.9060E−06 |
| 1 ($4^{th}$ region) | −0.6800 | −1.8790E−02 | 7.0280E−03 | −5.2250E−04 | −5.9690E−06 | −1.4636E−05 |
| 2 | −0.6800 | −9.5810E−02 | 8.9370E−02 | −2.9080E−02 | 5.8260E−03 | −4.1494E−04 |
| 3 | 0.0000 | 2.5040E−02 | 2.1190E−04 | −4.7250E−03 | 1.5920E−03 | −1.7370E−04 |

The objective lens 10 according to the fourth example is provided with a phase shift structure (corresponding to the above mentioned first phase shift structure) on the entire region of the cementing surface 13. In addition, on the first surface 11 of the objective lens 10, the second phase shift structure is formed on the third region including the optical axis and the fourth phase shift structure is formed in the fourth region located outside the third region. The following Table 30 shows the coefficients $P_{2i}$ (i: positive integer) of the optical path difference function specifying each of the phase shift structures of the objective lens 10 according to the fourth example. Table 31 shows diffraction orders at which the first to third laser beams take the respective maximum diffraction efficiencies, and the effective radiuses (unit:mm) of the regions and surfaces.

FIG. 8A is a graph illustrating the spherical aberration caused when the first laser beam is used in the optical information recording/reproducing device 100 provided with the objective lens 10 according to the fourth example. FIG. 8B is a graph illustrating the spherical aberration caused when the second laser beam is used in the optical information recording/reproducing device 100 provided with the objective lens 10 according to the fourth example. FIG. 8C is a graph illustrating the spherical aberration caused when the third laser beam is used in the optical information recording/reproducing device 100 provided with the objective lens 10 according to the fourth example.

As shown by the solid lines in FIGS. 8A to 8C, the spherical aberration can be suitably corrected for each of the optical

TABLE 30

| Surface No. | P2 | P4 | P6 | P8 | P10 | P12 |
|---|---|---|---|---|---|---|
| 1 ($3^{rd}$ region) | 0.0000E+00 | −3.1410E+00 | 1.6300E+00 | −2.2310E−01 | 0.0000E+00 | 0.0000E+00 |
| 1 ($4^{th}$ region) | 0.0000E+00 | −6.1240E+00 | 3.0160E+00 | −3.7880E−01 | 0.0000E+00 | 0.0000E+00 |
| 2 | 0.0000E+00 | −7.7110E−01 | 4.4800E−02 | −8.7160E−02 | 0.0000E+00 | 0.0000E+00 |

TABLE 31

| Diffraction Order m | $1^{st}$ laser beam | $2^{nd}$ laser beam | $3^{rd}$ laser beam | Effective Radius |
|---|---|---|---|---|
| 1 ($3^{rd}$ region) | 10 | 6 | 5 | 1.59 |
| 1 ($4^{th}$ region) | 5 | 3 | 3 | 1.95 |
| 2 | 5 | 3 | — | 1.90 |

As can be seen from the above described Tables, $\Phi1=0.072$, $\Phi2=0.067$, and $\Phi3=0.081$, and $\Phi2/\Phi1=0.931$, and $|(\Phi3-\Phi2)/\Phi1|=0.194$. Therefore, the conditions (1), (2), (4) to (7) are satisfied. Table 32 shows the diffraction efficiencies respectively defined when the first to third laser beams (the optical discs D1 to D3) are used in the optical information recording/reproducing device 100 having the objective lens 10 according to the fourth example. As a comparative example ("Comparative Example 2" in Table 32), Table 32 also shows diffraction efficiencies, regarding a conventional single-element objective lens, respectively defined when the first to third laser beams (the optical discs D1 to D3) are used.

TABLE 32

|  | fourth Example | Comparative Example 2 |
|---|---|---|
| $1^{st}$ lease beam | 100.0% | 100.0% |
| $2^{nd}$ laser beam | 98.0% | 99.5% |
| $3^{rd}$ laser beam | 56.4% | 33.4% |

As can be seen from Table 32, regarding each of the optical discs D2 and D3, the fourth example provides a higher diffraction efficiency than that of the comparative example 2. Therefore, the objective lens 10 according to the fourth example is able to maintain the high use efficiency of light for each of the first to third laser beams.

discs D1 to D3. That is, by employing the objective lens 10 according to the fourth example, it is possible to suitably converge the first to third laser beams (having the respective design wavelengths) on the record surfaces of the first to third optical discs D1 to D3, respectively.

As can be seen from the dashed lines in FIGS. 8A to 8C, it is also possible to keep the spherical aberration, caused by the minute wavelength shift of the laser beam emitted by each of the light sources 1A to 1C, at a small level. That is, by employing the objective lens 10 according to the fourth example, it is possible to keep the suitable convergence state for each of the first to third laser beams even if the wavelength of the laser beam shifts by a minute amount.

As described above, the fourth region formed on the first surface 11 of the objective lens 10 according to the fourth example is configured such that the diffraction order at which the diffraction efficiency for the first laser beam is maximized is the $5^{th}$ order. Therefore, the third laser beam passed through the fourth region does not contribute to the convergence of the third laser beam. That is, the objective lens 10 according to the fourth examples has the function as an aperture stop for the third laser beam.

As shown in Tables 26 to 28, the center thickness d1 of the first optical member 10A is 0.10, and the center thickness d2 of the second optical member 10B is 2.50. In this case, d1/d2 is 0.040. Therefore, the objective lens 10 according to the fourth example also satisfies the condition (10).

FIFTH EXAMPLE

The objective lens 10 according to a fifth example is designed based on the configuration shown in the above mentioned fourth example. More specifically, on the first surface 11 of the objective lens 10 according to the fifth example, the sixth region having the sixth phase shift structure is provided. The following Table 33 shows concrete specifications of the objective lens 10 according to the fifth example.

TABLE 33

|  | 1st laser beam | 2nd laser beam | 3rd laser beam |
| --- | --- | --- | --- |
| Wavelength (nm) | 405 | 660 | 790 |
| Focal Length (mm) | 3.00 | 3.10 | 3.12 |
| NA | 0.65 | 0.65 | 0.51 |
| Magnification M | 0.000 | 0.000 | 0.000 |

The following Table 34 shows specific numerical configuration defined when the first optical disc D1 is used in the optical information recording/reproducing device 100 provided with the objective lens 10 having the specifications shown in Table 33. The following Table 35 shows specific numerical configuration defined when the second optical disc D2 is used in the optical information recording/reproducing device 100 provided with the objective lens 10 having the specifications shown in Table 33. The following Table 36 shows specific numerical configuration defined when the third optical disc D3 is used in the optical information recording/reproducing device 100 provided with the objective lens 10 having the specifications shown in Table 33.

TABLE 34

| Surface No. | r | d | n(405 nm) | |
| --- | --- | --- | --- | --- |
| 0 | ∞ | | | Light Source |
| 1 (3rd region) | 1.980 | 0.10 | 1.53212 | Objective Lens |
| 1 (4th region) | 1.980 | | | |
| 1 (6th region) | 1.980 | | | |
| 2 | 1.785 | 2.50 | 1.56023 | |
| 3 | −6.012 | 1.21 | | |
| 4 | ∞ | 0.60 | 1.62231 | Optical Disc |
| 5 | ∞ | — | | |

TABLE 35

| Surface No. | r | d | n(660 nm) | |
| --- | --- | --- | --- | --- |
| 0 | ∞ | | | Light Source |
| 1 (3rd region) | 1.980 | 0.10 | 1.51073 | Objective Lens |
| 1 (4th region) | 1.980 | | | |
| 1 (6th region) | 1.980 | | | |
| 2 | 1.785 | 2.50 | 1.54044 | |
| 3 | −6.012 | 1.29 | | |
| 4 | ∞ | 0.60 | 1.57961 | Optical Disc |
| 5 | ∞ | — | | |

TABLE 36

| Surface No. | r | d | n(790 nm) | |
| --- | --- | --- | --- | --- |
| 0 | ∞ | | | Light Source |
| 1 (3rd region) | 1.980 | 0.10 | 1.50741 | Objective Lens |
| 1 (4th region) | 1.980 | | | |
| 1 (6th region) | 1.980 | | | |
| 2 | 1.785 | 2.50 | 1.53653 | |
| 3 | −6.012 | 0.92 | | |
| 4 | ∞ | 1.20 | 1.57307 | Optical Disc |
| 5 | ∞ | — | | |

In Tables 34 to 36, surface No. 0 represents the light source (1A, 1B, 1C), surface No. 1 represents the first surface 11 of the objective lens 10, surface No. 2 represents the cementing surface 13 of the objective lens 10, surface No. 3 represents the second surface 12 of the objective lens 10, and surfaces Nos. 4 and 5 represent the protective layer 21 and the record surface 22 of the optical disc. In each of the Tables 34 to 36, three separate columns for the 3rd, 4th and 6th regions are assigned to surface No. 1.

The first surface 11, the cementing surface 13 and the second surface 12 of the objective lens 10 (surfaces Nos. 1, 2 and 3) are aspherical surfaces. The following Table 37 shows the cone constant and aspherical coefficients specifying the shape of each aspherical surface (11, 12, 13).

TABLE 37

| Surface No. | K | A4 | A6 | A8 | A10 | A12 |
| --- | --- | --- | --- | --- | --- | --- |
| 1 (3rd region) | −0.6800 | −2.0670E−02 | 8.1710E−03 | −4.1230E−04 | −2.0500E−04 | 9.1350E−06 |
| 1 (4th region) | −0.6800 | −1.9710E−02 | 7.6680E−03 | −7.8520E−04 | 3.4050E−05 | −1.6874E−05 |
| 1 (6th region) | −0.6800 | −1.5480E−02 | 4.2570E−03 | 1.1560E−04 | −5.1020E−05 | −1.3072E−05 |
| 2 | −0.6800 | −9.9480E−02 | 8.9740E−02 | −2.8790E−02 | 5.8790E−03 | −4.5250E−04 |
| 3 | 0.0000 | 2.5510E−02 | 4.7900E−04 | −5.3960E−03 | 2.0190E−03 | −2.5430E−04 |

The objective lens 10 according to the fifth example is provided with a phase shift structure (corresponding to the above mentioned first phase shift structure) on the entire region of the cementing surface 13. In addition, on the first surface 11 of the objective lens 10, the second phase shift structure is formed in the third region including the optical axis, the fourth phase shift structure is formed in the fourth region located outside the third region, and the sixth phase shift structure is formed in the sixth region located outside the fourth region. The following Table 38 shows the coefficients $P_{2i}$ (i: positive integer) of the optical path difference function specifying each of the phase shift structures of the objective lens 10 according to the fifth example. Table 39 shows diffraction orders at which the first to third laser beams take the respective maximum diffraction efficiencies, and the effective radiuses (unit:mm) of the regions and surfaces.

TABLE 38

| Surface No. | P2 | P4 | P6 | P8 | P10 | P12 |
|---|---|---|---|---|---|---|
| 1 ($3^{rd}$ region) | 0.0000E+00 | −3.3420E+00 | 1.7310E+00 | −2.4700E−01 | 0.0000E+00 | 0.0000E+00 |
| 1 ($4^{th}$ region) | 0.0000E+00 | −6.3140E+00 | 3.0690E+00 | −3.9260E−01 | 0.0000E+00 | 0.0000E+00 |
| 1 ($6^{th}$ region) | 0.0000E+00 | −1.7700E+01 | 8.3160E+00 | −1.0110E+00 | 0.0000E+00 | 0.0000E+00 |
| 2 | 0.0000E+00 | −7.2200E−01 | 4.1600E−02 | −8.2100E−02 | 0.0000E+00 | 0.0000E+00 |

TABLE 39

| Diffraction Order m | $1^{st}$ least beam | $2^{nd}$ laser beam | $3^{rd}$ laser beam | Effective Radius |
|---|---|---|---|---|
| 1($3^{rd}$ region) | 10 | 6 | 5 | 1.59 |
| 1($4^{th}$ region) | 5 | 3 | 3 | 1.95 |
| 1($6^{th}$ region) | — | 1 | — | 2.02 |
| 2 | 5 | 3 | 3 | 1.83 |

As can be seen from the above described Tables, $\Phi 1=0.072$, $\Phi 2=0.067$, and $\Phi 3=0.081$, and $\Phi 2/\Phi 1=0.931$, and $|(\Phi 3-\Phi 2)/\Phi 1|=0.194$. Therefore, the conditions (1), (2), (4) to (7) are satisfied. Table 40 shows the diffraction efficiencies respectively defined when the first to third laser beams (the optical discs D1 to D3) are used in the optical information recording/reproducing device 100 having the objective lens 10 according to the fifth example. As a comparative example ("Comparative Example 2" in Table 32), Table 40 also shows diffraction efficiencies, regarding a conventional single-element objective lens, respectively defined when the first to third laser beams (the optical discs D1 to D3) are used.

TABLE 40

| | fourth Example | Comparative Example 2 |
|---|---|---|
| $1^{st}$ lease beam | 100.0% | 100.0% |
| $2^{nd}$ laser beam | 98.1% | 99.5% |
| $3^{rd}$ laser beam | 56.4% | 33.4% |

As can be seen from Table 40, regarding each of the optical discs D2 and D3, the fifth example provides a higher diffraction efficiency than that of the comparative example 2. Therefore, the objective lens 10 according to the fifth example is able to maintain the high use efficiency of light for each of the first to third laser beams.

FIG. 9A is a graph illustrating the spherical aberration caused when the first laser beam is used in the optical information recording/reproducing device 100 provided with the objective lens 10 according to the fifth example. FIG. 9B is a graph illustrating the spherical aberration caused when the second laser beam is used in the optical information recording/reproducing device 100 provided with the objective lens 10 according to the fifth example. FIG. 9C is a graph illustrating the spherical aberration caused when the third laser beam is used in the optical information recording/reproducing device 100 provided with the objective lens 10 according to the fifth example.

As shown by the solid lines in FIGS. 9A to 9C, the spherical aberration can be suitably corrected for each of the optical discs D1 to D3. That is, by employing the objective lens 10 according to the fifth example, it is possible to suitably converge the first to third laser beams (having the respective design wavelengths) on the record surfaces of the first to third optical discs D1 to D3, respectively.

As can be seen from the dashed lines in FIGS. 9A to 9C, it is also possible to keep the spherical aberration, caused by the minute wavelength shift of the laser beam emitted by each of the light sources 1A to 1C, at a small level. That is, by employing the objective lens 10 according to the fifth example, it is possible to keep the suitable convergence state for each of the first to third laser beams even if the wavelength of the laser beam shifts by a minute amount.

As described above, the objective lens 10 according to the fifth example has the fourth and sixth regions. The fourth region formed on the first surface 11 of the objective lens 10 according to the fifth example is configured such that the diffraction order at which the diffraction efficiency for the first laser beam is maximized is the $5^{th}$ order. Therefore, the fourth region does not contribute to the convergence of the third laser beam.

Further, the objective lens 10 according to the fifth example satisfies the condition (9), and the sixth region is configured such that the diffraction order at which the diffraction efficiency for the second laser beam is maximized is the 1st order. By this structure, the sixth region does not contribute to the convergence of the first laser beam. That is, the objective lens 10 according to the fifth examples has the function as an aperture stop.

As shown in Tables 26 to 28, the center thickness d1 of the first optical member 10A is 0.10, and the center thickness d2 of the second optical member 10B is 2.50. In this case, d1/d2 is 0.040. Therefore, the objective lens 10 according to the fifth example also satisfies the condition (10).

Although the present invention has been described in considerable detail with reference to certain preferred embodiments thereof, other embodiments are possible.

For example, the above mentioned cementing surface may be divided into two regions (e.g., first and second regions) having different phase shift structures (e.g., first and third phase shift structures) so as to achieve the function as an aperture stop for the third laser beam.

This application claims priority of Japanese Patent Application No. P2006-170815, filed on Jun. 21, 2006. The entire subject matter of the application is incorporated herein by reference.

What is claimed is:

1. An objective lens used for an optical information recording/reproducing device for recording information to and/or reproducing information from three types of optical discs including a first optical disc having a highest recording density, a second optical disc having a second highest recording density and a third optical disc having a lowest recording density, by selectively using one of three types of light beams including first, second and third light beams, when wavelengths of the first to third light beams are respectively represented by $\lambda_1$ (nm), $\lambda_2$ (nm) and $\lambda_3$ (nm), $\lambda_1 < \lambda_2 < \lambda_3$ being satisfied, when a thickness of a protective layer of the first optical disc requiring use of the first light beam is represented by t1 (mm), a thickness of a protective layer of the second optical disc requiring use of the second light beam is represented by t2 (mm), and a thickness of a protective layer of the third optical disc requiring use of the third light beam is represented by t3 (mm), $t1 \leq t2 < t3$ being satisfied, when a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 being satisfied, wherein:

the objective lens comprises a first optical member and a second optical member of materials different from each other and cemented together at a cementing surface;

the cementing surface comprises a first phase shift structure having a plurality of refractive surface zones concentrically formed about an optical axis of the objective lens;

the first phase shift structure satisfies conditions (1) and (2):

$$0.85 < \Phi2/\Phi1 < 1.15 \quad (1)$$

$$0.10 < |(\Phi3-\Phi2)/\Phi1| < 0.50 \quad (2)$$

where $\Phi1 = m(\lambda_1) \times \lambda_1/(n2(\lambda_1) - n1(\lambda_1))$, $\Phi2 = m(\lambda_2) \times (\lambda_2/(n2(\lambda_2) - n1(\lambda_2)))$, $\Phi3 = m(\lambda_3) \times (\lambda_3/(n2(\lambda_3) - n1(\lambda_3)))$, $m(\lambda_1)$, $m(\lambda_2)$, and $m(\lambda_3)$ are diffraction orders at which diffraction efficiencies of the first through third light beams are maximized, respectively, n1 $(\lambda_1)$, n1 $(\lambda_2)$, and n1 $(\lambda_3)$ are refractive indexes of the first optical member, respectively, and n2 $(\lambda_1)$, n2 $(\lambda_2)$, and n2 $(\lambda_3)$ are refractive indexes of the second optical member, respectively.

2. The objective lens according to claim 1, wherein the first phase shift structure further satisfies conditions (3) and (4):

$$1.00 \leq \Phi2/\Phi1 < 1.15 \quad (3)$$

$$0.20 < |(\Phi3-\Phi2)/\Phi1| < 0.50 \quad (4).$$

3. The objective lens according to claim 1, wherein the first phase shift structure further satisfies a condition (5):

$$0.20 < |(\Phi3-\Phi2)/\Phi1| < 0.40 \quad (5).$$

4. The objective lens according to claim 1, wherein the first phase shift structure further satisfies condition (6) and (7):

$$0.85 < \Phi2/\Phi1 < 1.00 \quad (6)$$

$$0.20 < |(\Phi3-\Phi2)/\Phi1| < 0.35 \quad (7).$$

5. The objective lens according to claim 1, wherein:

the objective lens includes two surfaces other than the cementing surface;

one of the two surfaces includes a second phase shift structure having a plurality of refractive surface zones concentrically formed about the optical axis; and the second phase shift structure is configured to provide an additional optical path length equal to $2\lambda_1$ to the first light beam, between adjacent ones of the plurality of refractive surface zones.

6. The objective lens according to claim 1, wherein:

the objective lens includes two surfaces other than the cementing surface;

one of the two surfaces includes a second phase shift structure having a plurality of refractive surface zones concentrically formed about the optical axis; and the second phase shift structure is configured to provide an additional optical path length equal to $10\lambda_1$ to the first light beam, between adjacent ones of the plurality of refractive surface zones.

7. The objective lens according to claim 1, wherein:

the first phase shift structure is formed, on the cementing surface, in a first region including the optical axis; and the first region is configured to converge at least the third light beam on a record surface of the third optical disc.

8. The objective lens according to claim 7, wherein:

the cementing surface has a second region located outside the first region; and the second region is a refraction surface having a function of converging the first and second light beams on record surfaces of the first and second optical discs, respectively, and not contributing to convergence of the third light beam.

9. The objective lens according to claim 7, wherein:

the cementing surface has a second region located outside the first region;

the second region being configured to converge the first and second light beams on record surfaces of the first and second optical discs, respectively, and not to contribute to convergence of the third light beam; and the second region includes a third phase shift structure having a plurality of refractive surface zones concentrically formed about the optical axis.

10. The objective lens according to claim 5, wherein:

the second phase shift structure is formed in a third region on the one of the two surfaces of the objective lens; and the third region is configured to converge at least the third light beam on a record surface of the third optical disc.

11. The objective lens according to claim 10, wherein:

one of the two surfaces other than the cementing surface includes a fourth region located outside the third region;

the fourth region includes a fourth phase shift structure having a plurality of refractive surface zones concentrically formed about the optical axis; and the fourth phase shift structure is configured to provide an additional optical path length equal to $3\lambda_1$ to the first light beam, between adjacent ones of the plurality of refractive surface zones.

12. The objective lens according to claim 10, wherein:

one of the two surfaces other than the cementing surface includes a fourth region located outside the third region;

the fourth region includes a fourth phase shift structure having a plurality of refractive surface zones concentrically formed about the optical axis; and the fourth phase shift structure is configured to provide an additional optical path length equal to $5\lambda_1$ to the first light beam, between adjacent ones of the plurality of refractive surface zones.

13. The objective lens according to claim 8, wherein: the objective lens satisfies a condition (8):

$$f1 \times NA1 > f2 \times NA2 \tag{8}$$

where f1 represents a focal length defined when the first optical disc is used, and f2 represents a focal length defined when the second optical disc is used; and
the cementing surface includes a fifth region which is located outside the second region and is configured to converge only the first light beam on the record surface of the first optical disc and not to contribute to convergence of each of the second and third light beams.

14. The objective lens according to claim 8, wherein: the objective lens satisfies a condition (9):

$$f1 \times NA1 < f2 \times NA2 \tag{9}$$

where f1 represents a focal length defined when the first optical disc is used, and f2 represents a focal length defined when the second optical disc is used; and
the cementing surface includes a fifth region which is located outside the second region and is configured to converge only the second light beam on the record surface of the second optical disc and not to contribute to convergence of each of the first and third light beams.

15. The objective lens according to claim 13, wherein: the fifth region includes a fifth phase shift structure having a plurality of refractive surface zones concentrically formed about the optical axis; and
the fifth phase shift structure is configured such that an absolute value of an optical path length difference provided to the first light beam between adjacent ones of the plurality of refraction surface zones is different from an absolute value of an optical path length difference provided to the first light beam in the second region.

16. The objective lens according to claim 14, wherein: the fifth region includes a fifth phase shift structure having a plurality of refractive surface zones concentrically formed about the optical axis; and
the fifth phase shift structure is configured such that an absolute value of an optical path length difference provided to the second light beam between adjacent ones of the plurality of refraction surface zones is different from an absolute value of an optical path length difference provided to the second light beam in the second region.

17. The objective lens according to claim 11, wherein: the objective lens satisfies a condition (8):

$$f1 \times NA1 > f2 \times NA2 \tag{8}$$

where f1 represents a focal length defined when the first optical disc is used, and f2 represents a focal length defined when the second optical disc is used;
one of the two surfaces other than the cementing surface includes a sixth region which is located outside the fourth region and is configured to converge only the first light beam on the record surface of the first optical disc and not to contribute to convergence of each of the second and third light beams;
the sixth region includes a sixth phase shift structure having a plurality of refractive surface zones concentrically formed about the optical axis; and
the sixth phase shift structure is configured such that an absolute value of an optical path length difference provided to the first light beam between adjacent ones of the plurality of refraction surface zones is different from an absolute value of an optical path length difference provided to the first light beam in the fourth region.

18. The objective lens according to claim 11, wherein: the objective lens satisfies a condition (9):

$$f1 \times NA1 < f2 \times NA2 \tag{9}$$

where f1 represents a focal length defined when the first optical disc is used, and f2 represents a focal length defined when the second optical disc is used;
one of the two surfaces other than the cementing surface includes a sixth region which is located outside the fourth region and is configured to converge only the second light beam on the record surface of the second optical disc and not to contribute to convergence of each of the first and third light beams;
the sixth region includes a sixth phase shift structure having a plurality of refractive surface zones concentrically formed about the optical axis; and
the sixth phase shift structure is configured such that an absolute value of an optical path length difference provided to the second light beam between adjacent ones of the plurality of refraction surface zones is different from an absolute value of an optical path length difference provided to the second light beam in the fourth region.

19. The objective lens according to claim 1, wherein: the objective lens is configured to satisfy a condition (10):

$$0.01 < d1/d2 < 0.20 \tag{10}$$

where d1 represents a center thickness of the first optical member (unit:mm), and d2 represents a center thickness of the second optical member (unit:mm).

20. An optical information recording/reproducing device for recording information to and/or reproducing information from three types of optical discs including a first optical disc having a highest recording density, a second optical disc having a second highest recording density and a third optical disc having a lowest recording density, by selectively using one of three types of light beams including first, second and third light beams,
the optical information recording/reproducing device comprising:
light sources that respectively emit the first, second and third light beams having different wavelengths; and
an objective lens,
wherein:
when wavelengths of the first to third light beams are respectively represented by $\lambda_1$ (nm), $\lambda_2$ (nm) and $\lambda_3$ (nm), $\lambda_1 < \lambda_2 < \lambda_3$ is satisfied;
when a thickness of a protective layer of the first optical disc requiring use of the first light beam is represented by t1 (mm), a thickness of a protective layer of the second optical disc requiring use of the second light beam is represented by t2 (mm), and a thickness of a protective layer of the third optical disc requiring use of the third light beam is represented by t3 (mm), $t1 \leq t2 < t3$ is satisfied; and
when a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 is satisfied, wherein the objective lens comprises a first optical member and a second optical member of materials different from each other and cemented together at a cementing surface, wherein the cementing surface comprises a first phase shift structure having a plurality of refractive surface zones concentrically formed about an optical axis of the objective lens, wherein the first phase shift structure satisfies conditions (1) and (2):

$$0.85 < \Phi 2/\Phi 1 < 1.15 \quad (1)$$

$$0.10 < |(\Phi 3 - \Phi 2)/\Phi 1| < 0.50 \quad (2)$$

where $\Phi 1 = m(\lambda_1) \times (\lambda_1/(n2(\lambda_1) - n1(\lambda_1)))$, $$\Phi 2 = m(\lambda_2) \times (\lambda_2/(n2(\lambda_2) - n1(\lambda_2))),$$

$$\Phi 3 = m(\lambda_3) \times (\lambda_3/(n2(\lambda_3) - n1(\lambda_3))),$$

$m(\lambda_1)$, $m(\lambda_2)$ and $m(\lambda_3)$ are diffraction orders at which diffraction efficiencies of the first through third light beams are maximized, respectively, $n1(\lambda_1)$, $n1(\lambda_2)$ and $n1(\lambda_3)$ are refractive indexes of the first optical member, respectively, and $n2(\lambda_1)$, $n2(\lambda_2)$, and $n2(\lambda_3)$ are refractive indexes of the second optical member, respectively.

21. The optical information recording/reproducing device according to claim 20, wherein t1 is 0.6 mm, t2 is 0.6 mm and t3 is 1.2 mm.

* * * * *